United States Patent [19]
Leblond et al.

[11] 3,850,719
[45] Nov. 26, 1974

[54] APPARATUS FOR AND METHOD OF TIRE STITCHING

[75] Inventors: Jean René Leblond; Guy Emile Danneels, both of Compiegene; Maurice Avrélien Lambert, Machemont, all of France

[73] Assignee: Uniroyal S.A., Clairoix, France

[22] Filed: June 23, 1972

[21] Appl. No.: 265,927

[30] Foreign Application Priority Data
July 13, 1971 France .............................. 71.25785

[52] U.S. Cl. .............. 156/128 R, 156/408, 156/410
[51] Int. Cl. ... B29h 17/02, B29h 17/08, B29h 17/18
[58] Field of Search .................... 156/123, 127–129, 156/132, 135, 400, 402, 408–413, 421; 250/202

[56] References Cited
UNITED STATES PATENTS

| | | | |
|---|---|---|---|
| 1,475,300 | 11/1923 | Harsell | 156/421 |
| 2,208,324 | 7/1940 | Haase | 156/408 |
| 2,489,305 | 11/1949 | McLennan | 250/202 |
| 2,681,684 | 6/1954 | Giletta | 156/410 |
| 2,685,909 | 8/1954 | Deist | 156/409 |
| 3,047,048 | 7/1962 | Appleby | 156/410 |
| 3,069,550 | 12/1962 | Neander | 250/202 |
| 3,423,272 | 1/1969 | Sornsen | 156/421 |

FOREIGN PATENTS OR APPLICATIONS
542,248  6/1957  Canada .............................. 156/410

*Primary Examiner*—Clifton B. Cosby
*Assistant Examiner*—John E. Kittle
*Attorney, Agent, or Firm*—Jack Posin, Esq.

[57] ABSTRACT

A substantially completely mechanical tire stitching apparatus comprising a stitching roller; first mechanical guiding means for individually and positively guiding said roller along a predetermined path on a tire surface to be rolled and stitched at a predetermined depth of penetration of said roller into said tire surface; and second mechanical guiding means for continuously orienting said roller at a substantially normal angle of incidence relative to said tire surface as said roller is guided thereover by said first mechanical guiding means.

17 Claims, 31 Drawing Figures

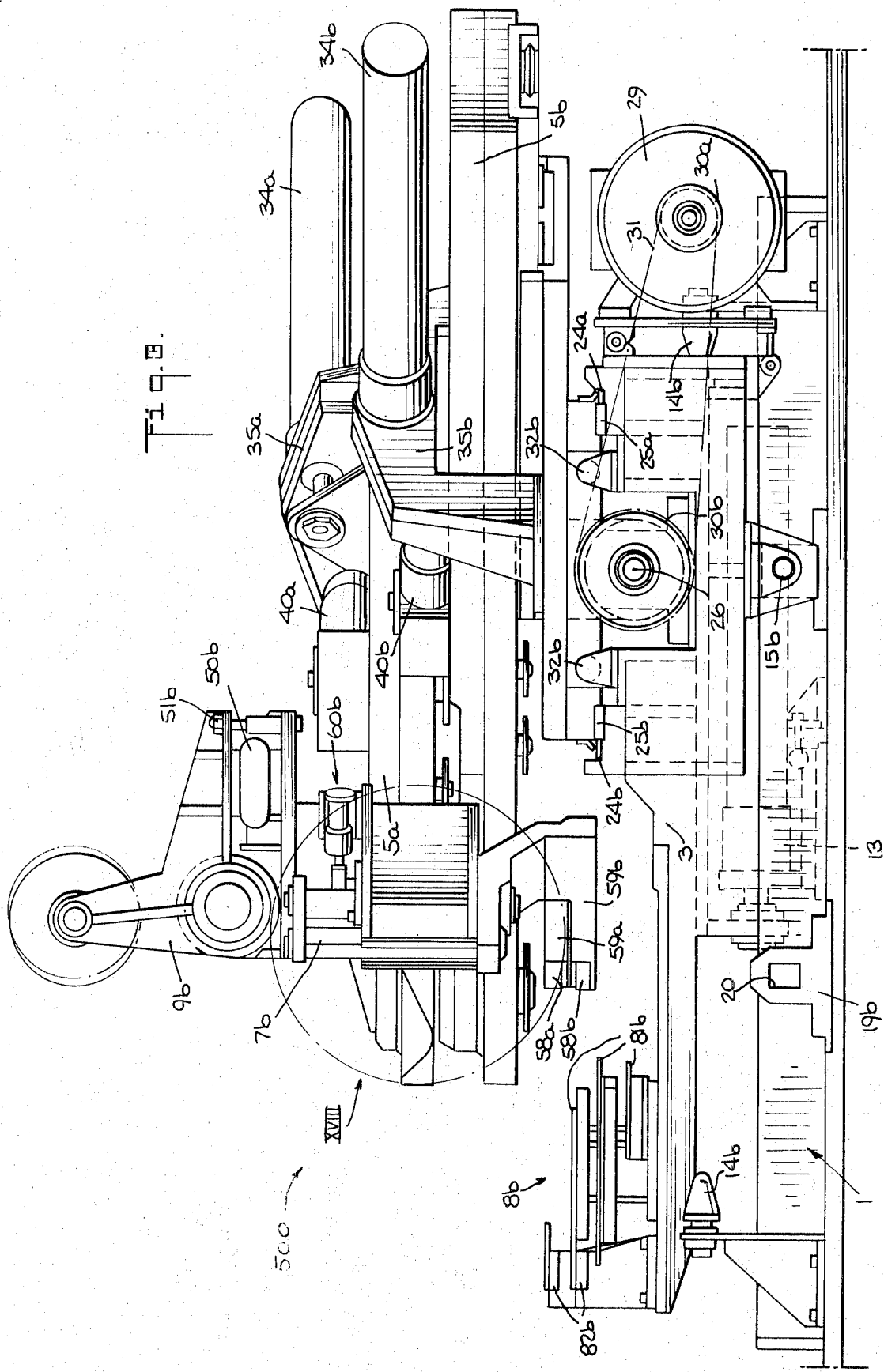

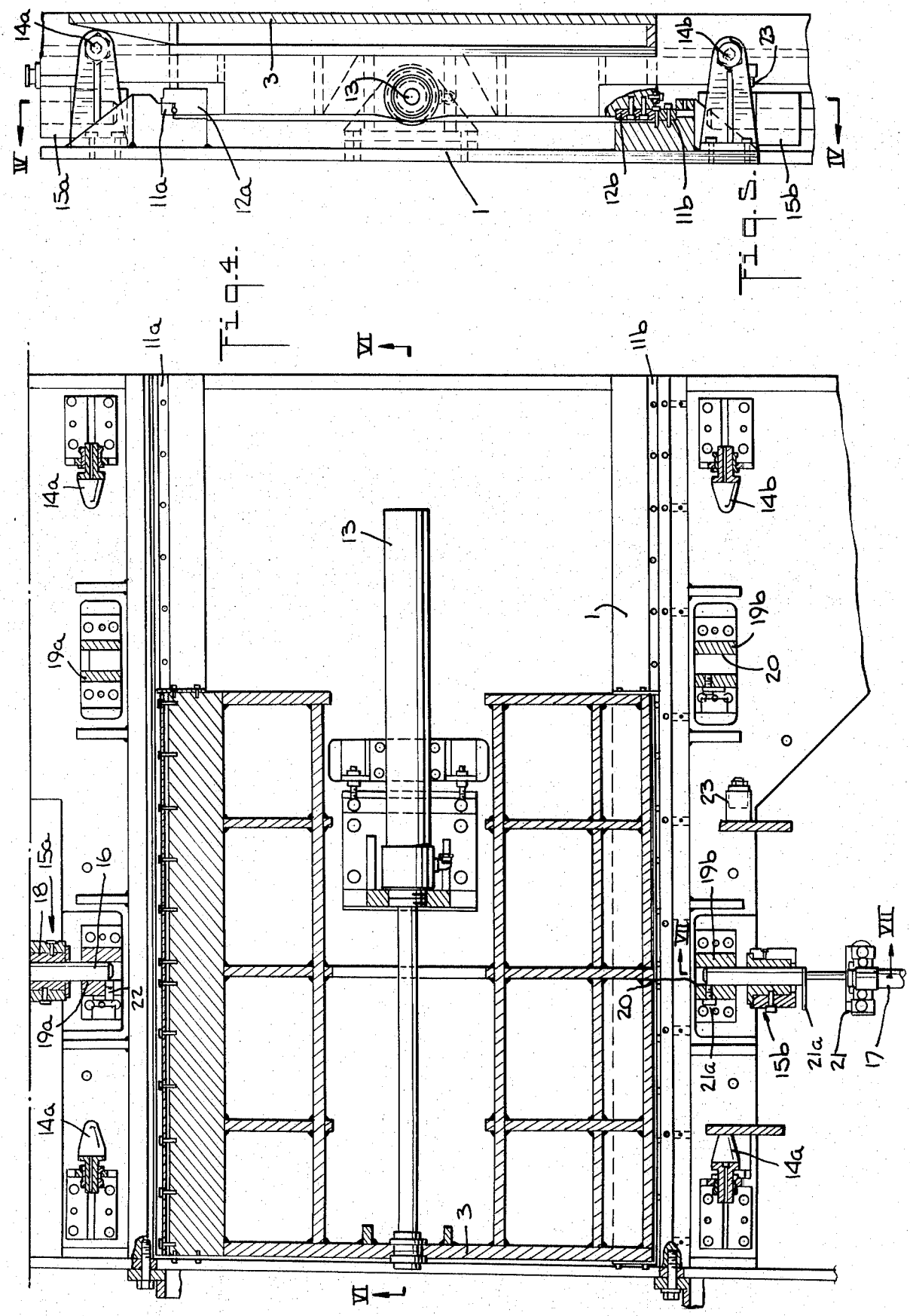

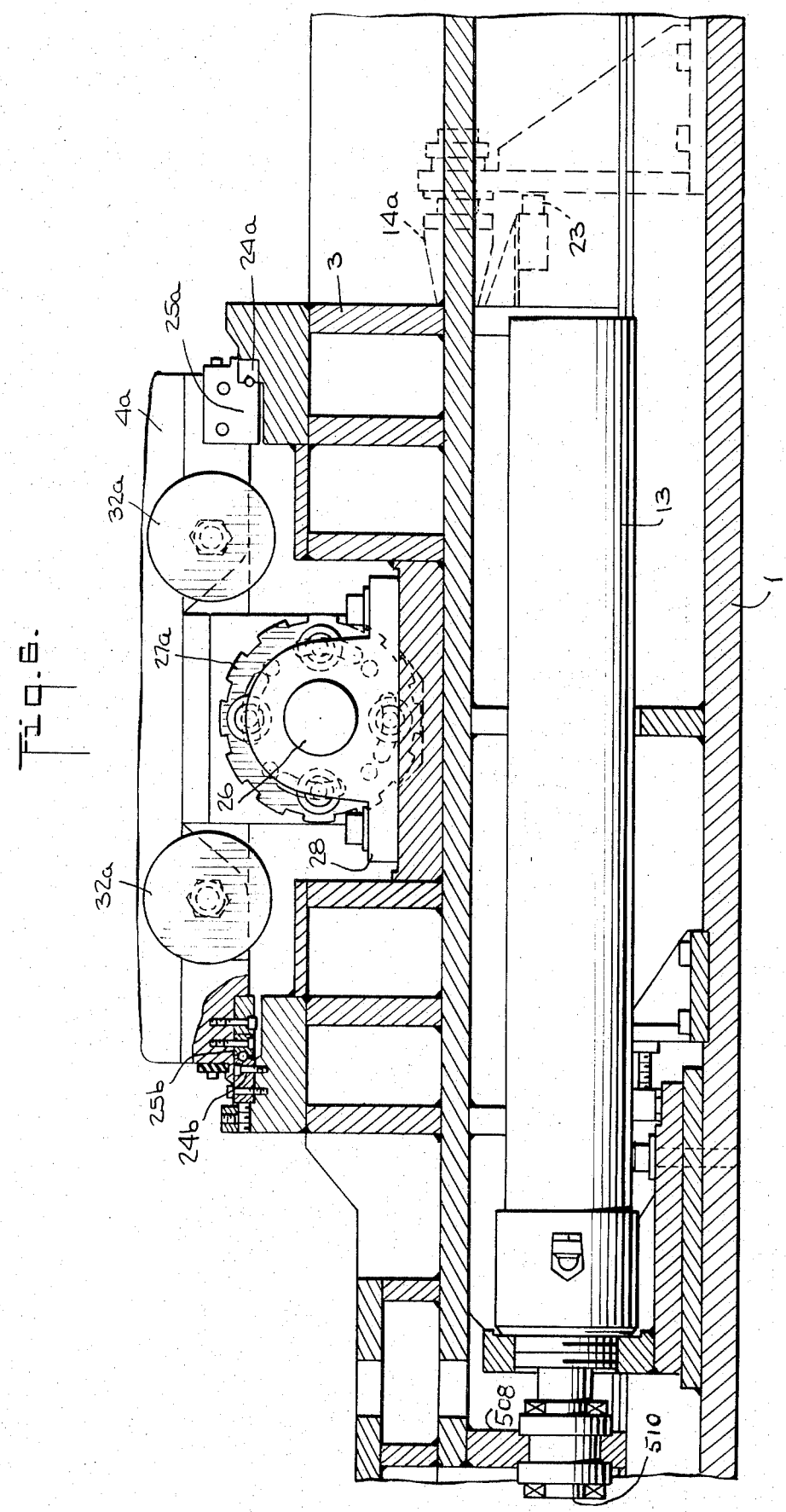

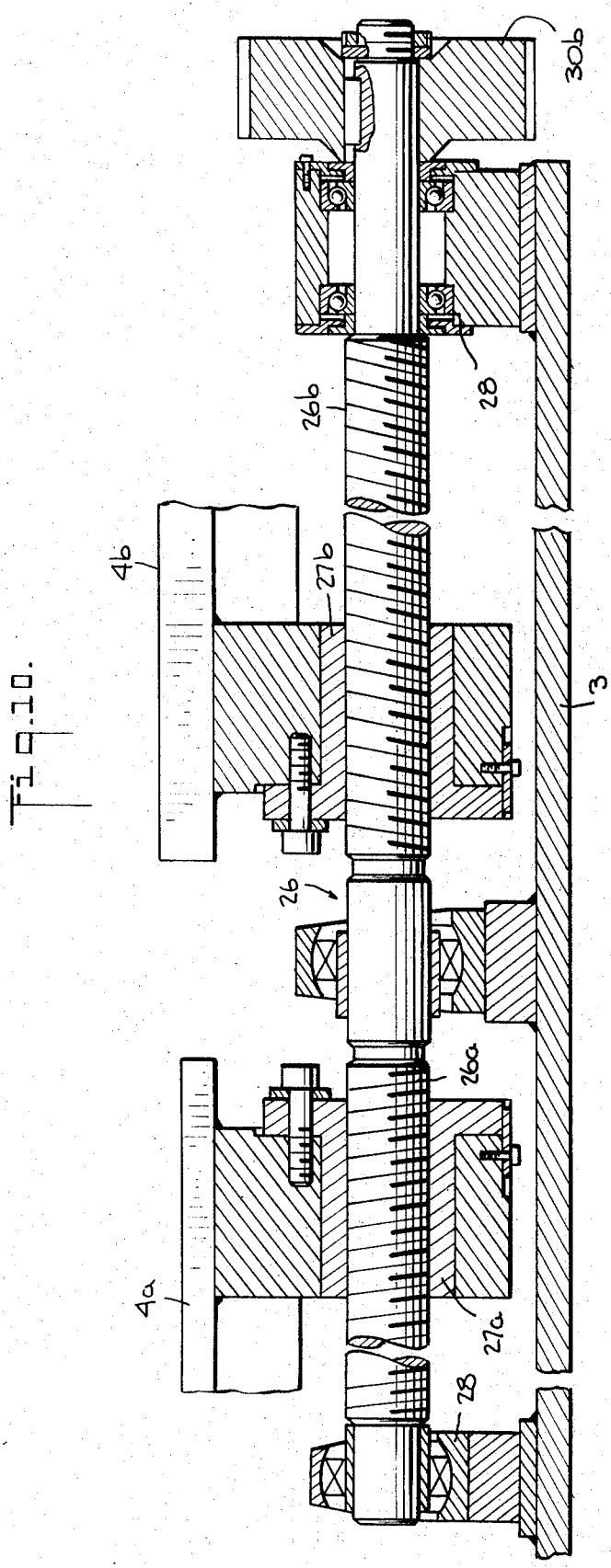

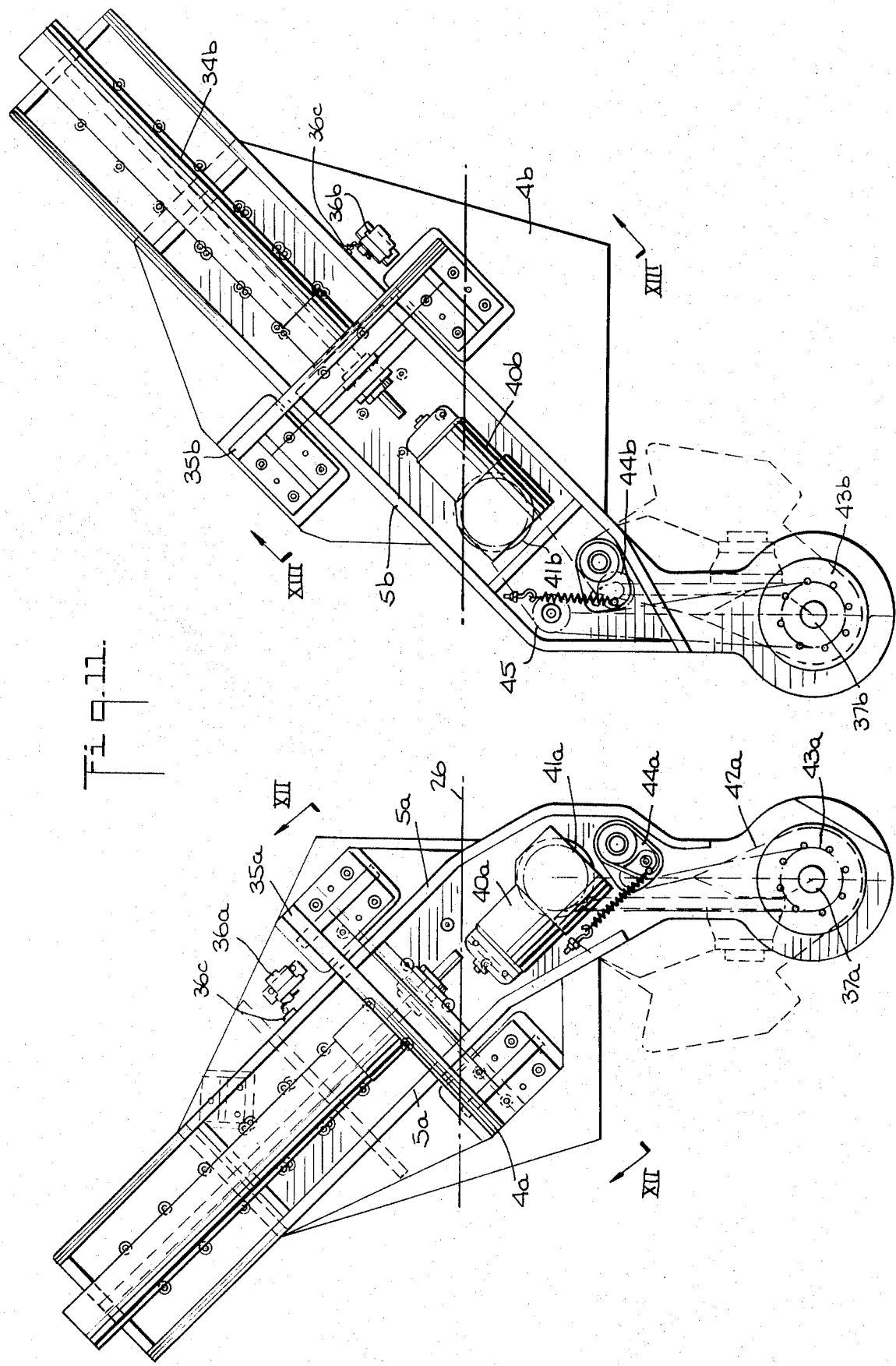

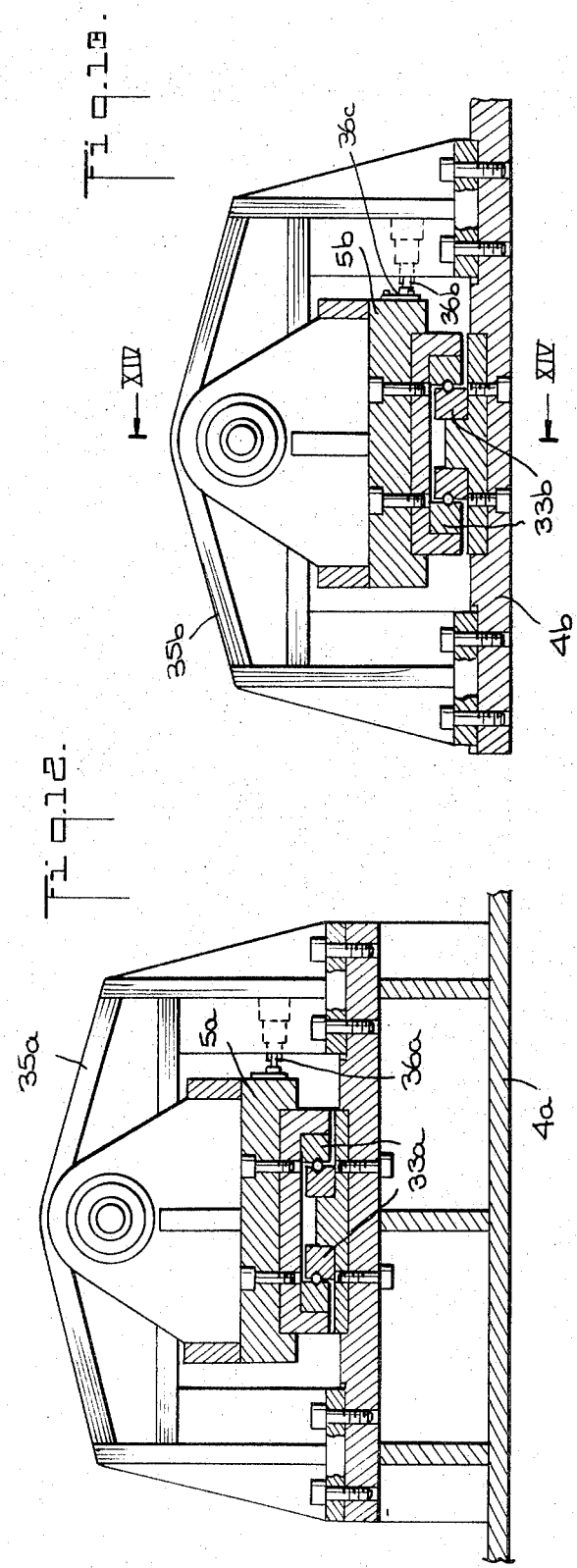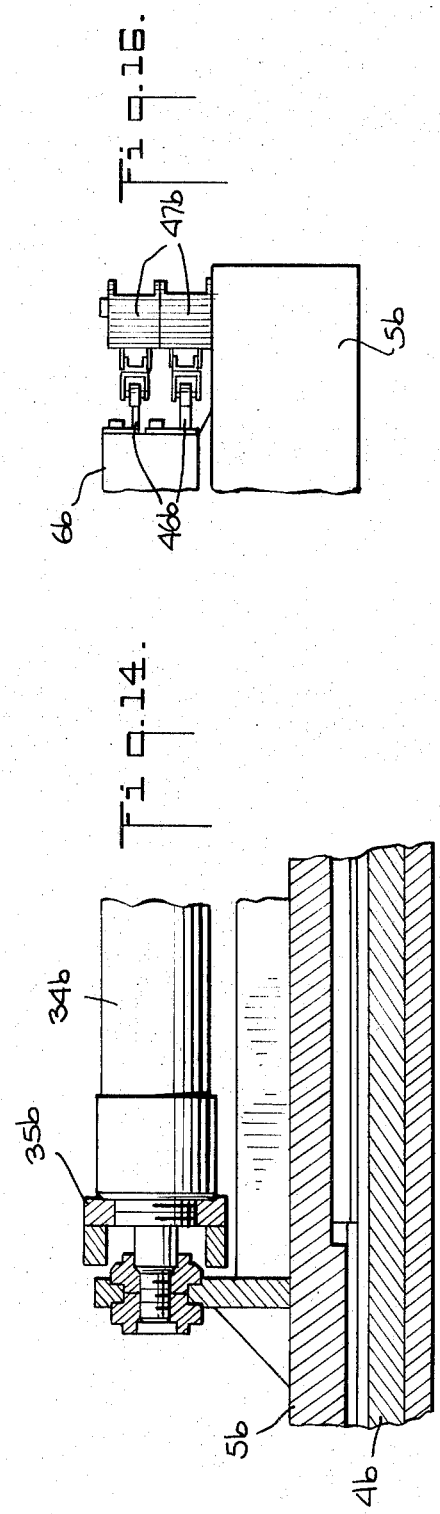

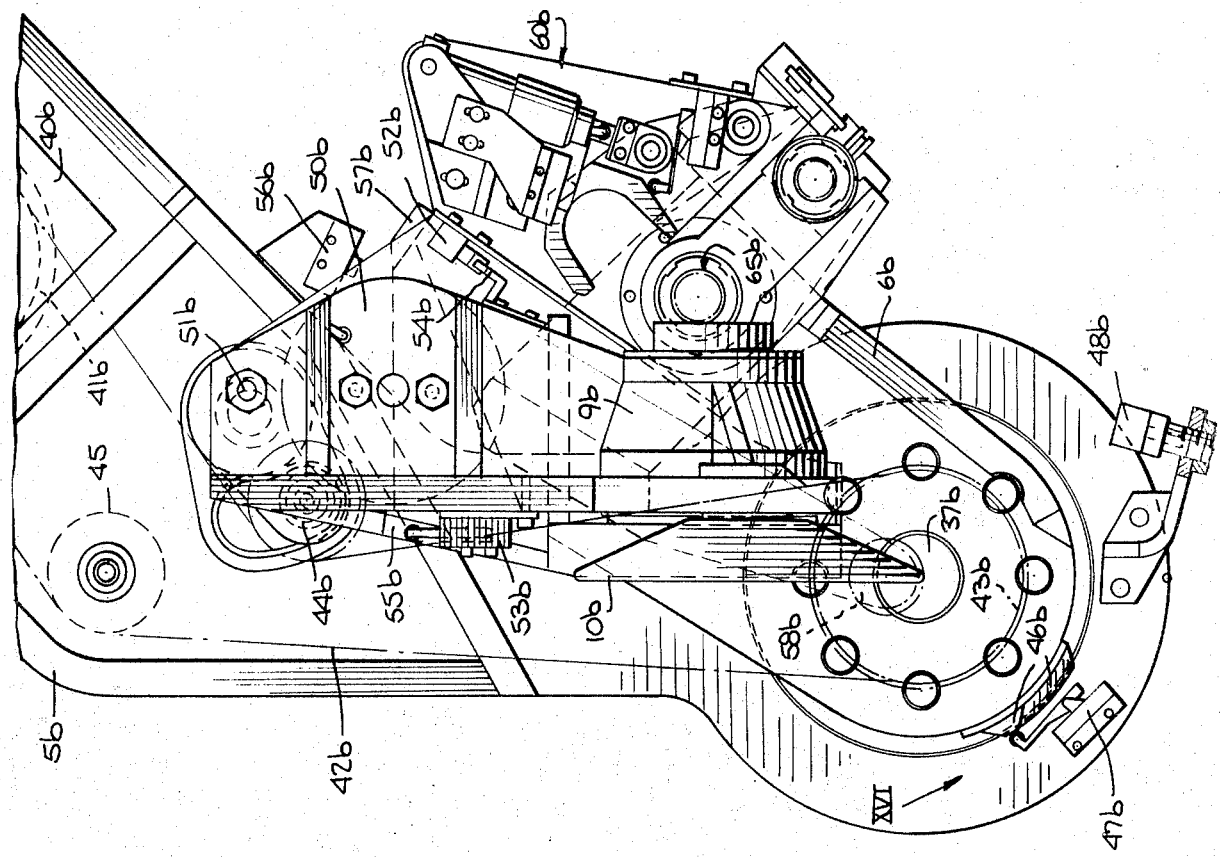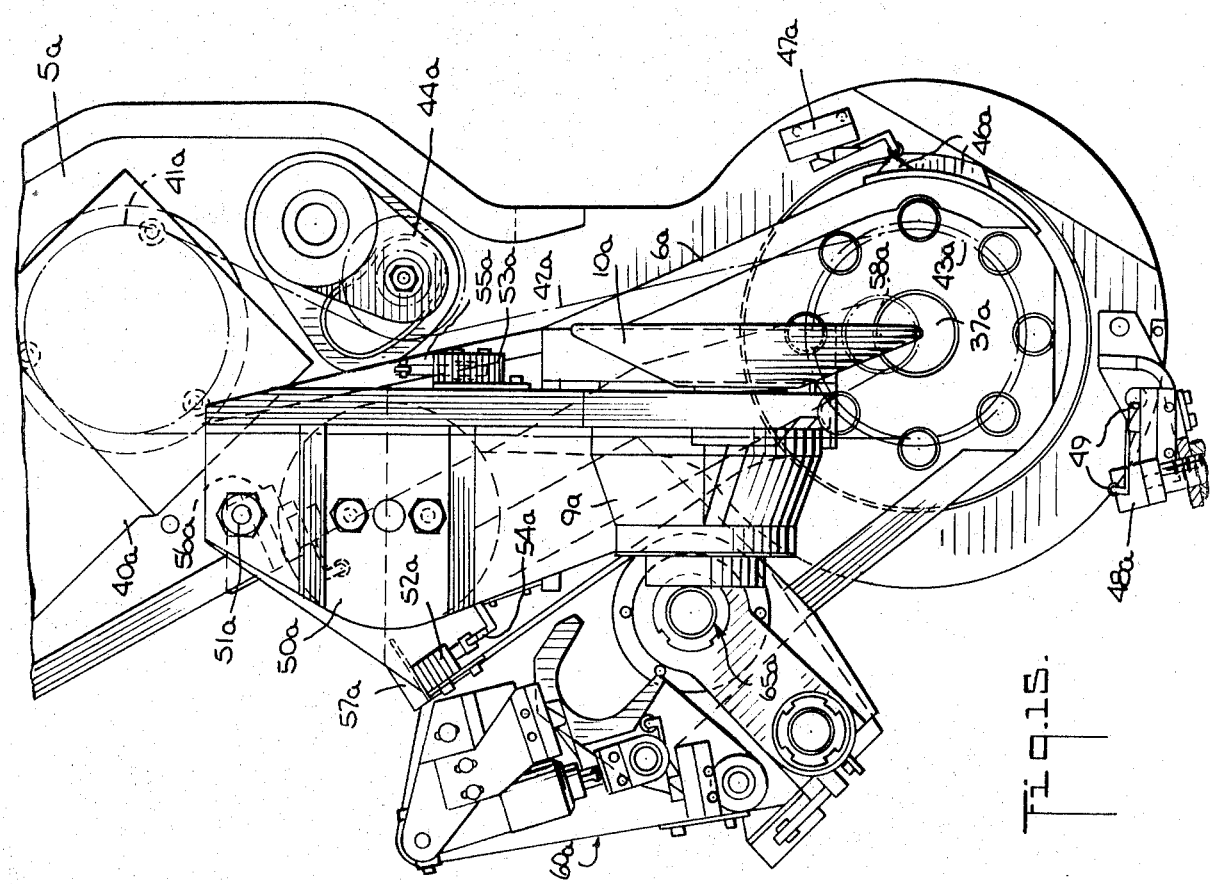
Fig.15.

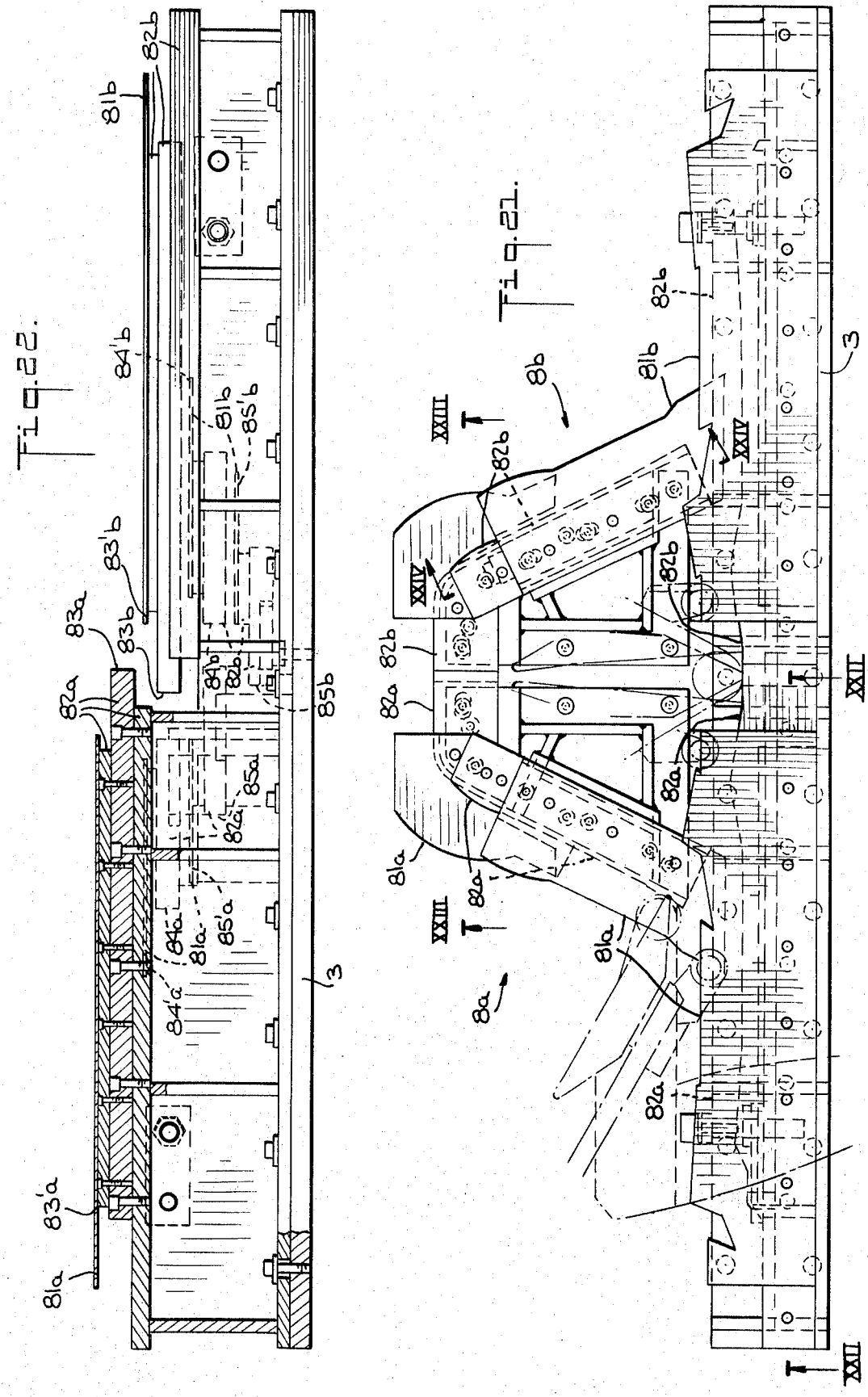

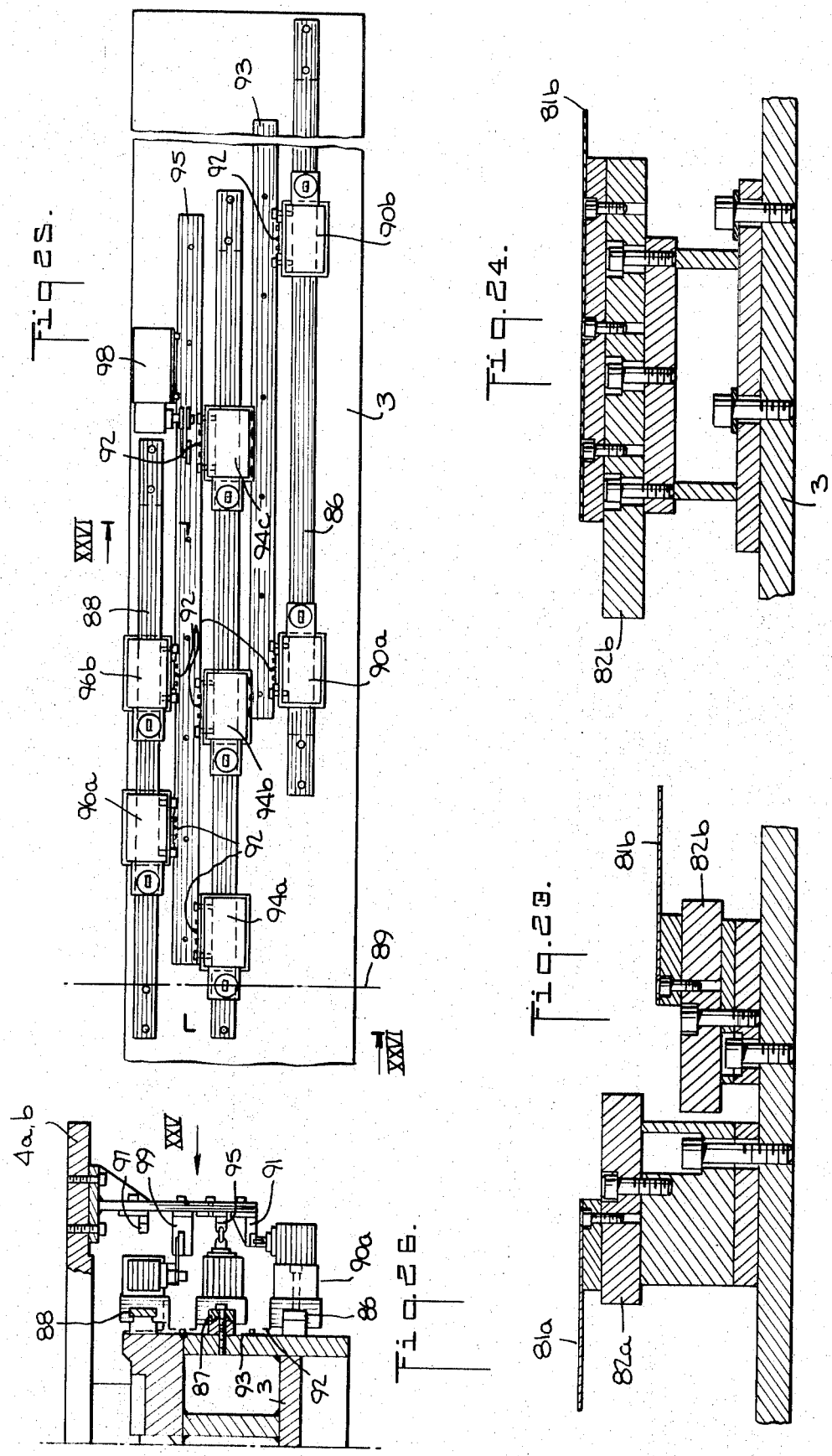

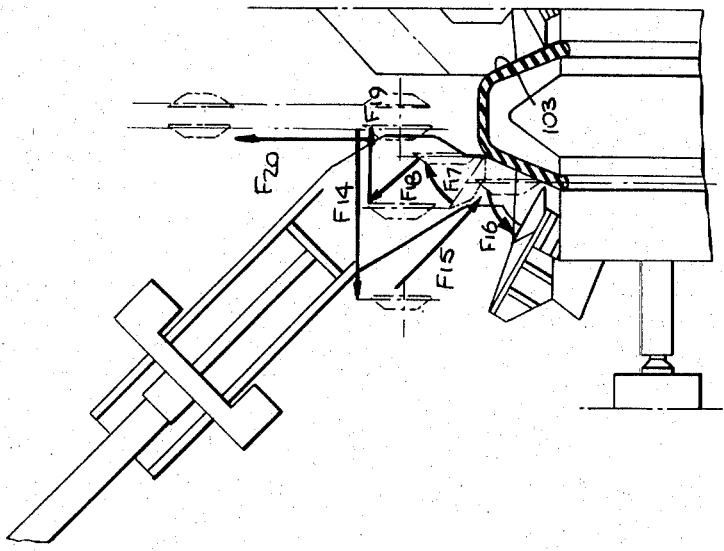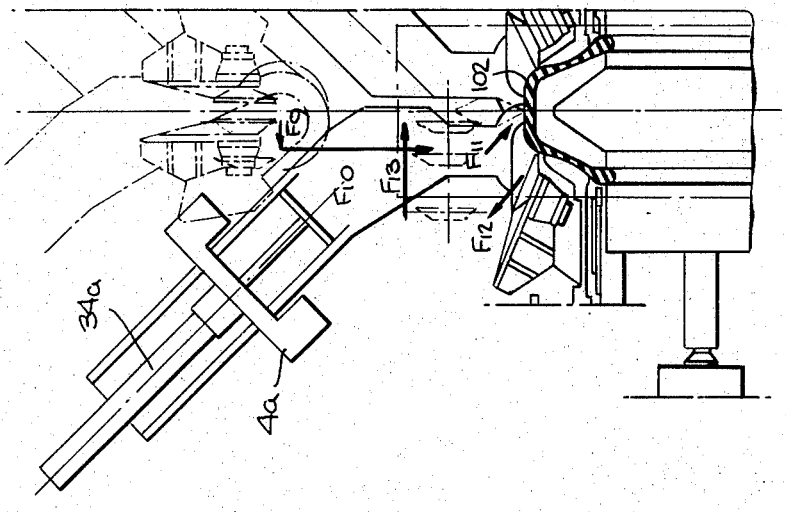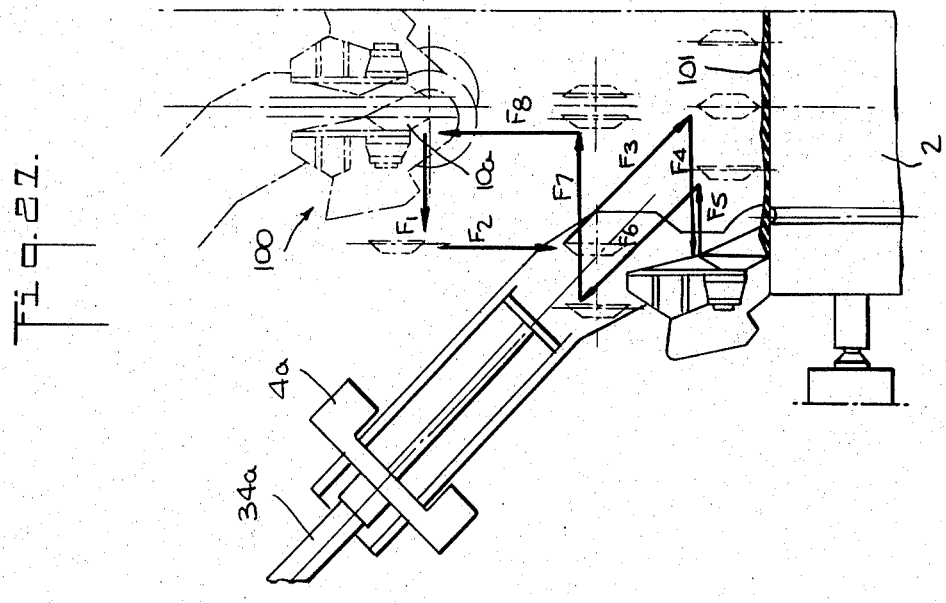

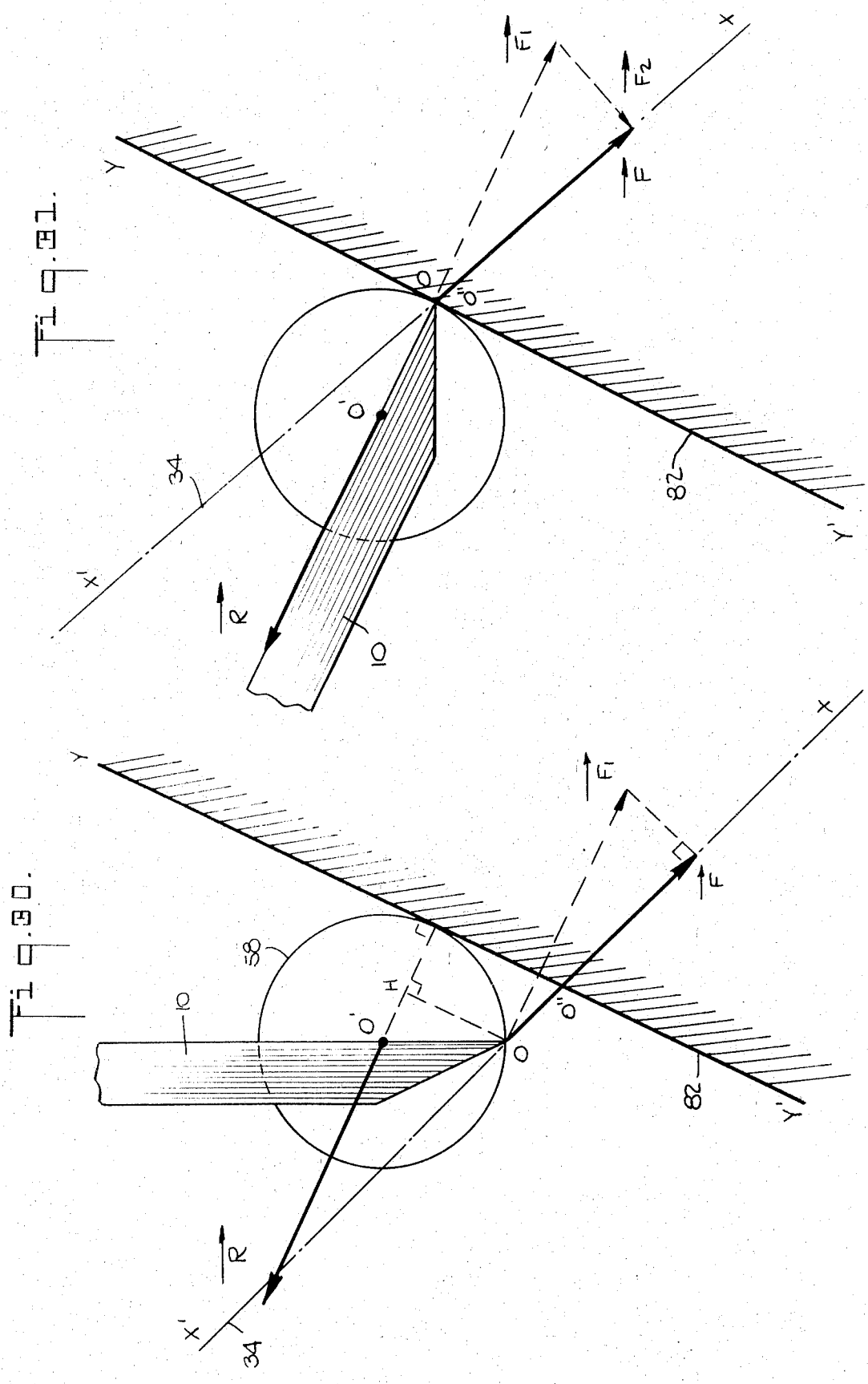

APPARATUS FOR AND METHOD OF TIRE STITCHING

BACKGROUND OF THE INVENTION

1. Field of the Invention

This invention relates to the manufacture of pneumatic tire tread coverings and, more particularly, to a tire stitching apparatus.

2. Description of the Prior Art

It is known that the operations for rolling and stitching the different layers of parts that make up a pneumatic tire tread covering, or the carcass of the latter are performed by means of rolling devices that have at least two loose or freely revolving rollers. In known tire stitching devices, such as disclosed in U.S. Pat. No. 2,685,909 to Deist, the rollers are applied to the carcass or tread covering of the pneumatic tire by a fluid, such as gas, that is supplied under a pressure that may be varied or adjusted according to the particular zone traveled by the rollers on the carcass or the tread covering. These known devices have the shortcoming that the rollers are not always oriented perpendicular to the surface being rolled. In certain zones being rolled and stitched, the rollers are oblique to the tire tread covering or carcass which thereby causes undesirable local elongations of the rolled-surface material. In addition, the depth of roller penetration in the material of the surfaces to be rolled and stitched is not in any way limited. Thus, when the rollers encounter a zone of lower tenacity or strength on the surfaces to be rolled, the roller penetration depth can become considerable, thereby producing undesirable distortion of the rolled-surface material.

U.S. Pat. No. 3,047,048 to Appleby discloses a tire stitching apparatus which employs the programmed action of rotating cams to prescribe controlled curvilinear pathways for the stitching rollers. However, Appleby employs a complex pneumatic system for responding to the peripheral edge variations of the cams to control the orientation of the rollers. Precise control over roller orientation and stitching depth is thus dependent upon the accuracy and efficiency of the pneumatic sensing apparatus. Therefore, it is difficult for Appleby to maintain continuously his rollers at a desired angle of incidence and depth of penetration with respect to a surface to be rolled.

It would be desirable to have a tire stitching device including such features so that it does not depend on such complex pneumatic sensing systems, that it always achieves a precise positioning of the stitching rollers at a desired angle of incidence to the tire to be rolled, and that it could accurately control the penetration, or stitching, depth of the rollers.

SUMMARY OF THE INVENTION

A tire stitching device according to the present invention achieves the above features in that it is substantially completely mechanical in construction and employs no complex pneumatic control systems, such as in the above-referenced prior art.

Generally speaking, a tire stitching apparatus of this invention comprises at least one stitching roller; first mechanical guiding means for individually and positively guiding said roller along a predetermined path on a tire surface to be rolled at a predetermined depth of penetration of said roller into a said tire surface; and second mechanical means for continuously and faithfully orienting said roller at a substantially normal angle of incidence relative to said tire surface as said roller is guided thereover by said first mechanical guiding means.

In a preferred embodiment of this invention, there are at least two stitching rollers and said first mechanical guiding means includes at least one profile-defining cam for each roller, means for following the peripheral edge variations of said cam, and means responsive to said follower means for individually and positively guiding said roller over said surface to be rolled. Further, said second mechanical guiding means includes at least one orientation-defining cam for each roller, means for following the peripheral edge variations of said orientation-defining cam, and means responsive to said latter following means for continuously orienting said roller at a substantially normal angle of incidence relative to said surface to be rolled.

As used in this application the word "profile" is defined as the path and depth of penetration of a roller on a tire surface to be stitched.

In another embodiment of this invention, a tire stitching apparatus comprises at least one stitching roller and mechanical guiding means for individually and positively guiding said roller along a predetermined path over a tire surface to be rolled and stitched at a predetermined depth of penetration of said roller into said tire surface, the mechanical guiding means including means for maintaining said roller in a state of stable equilibrium when oriented at a substantially normal angle of incidence relative to the tire surface to be rolled and, when said roller strikes said surface obliquely, for causing a torque to be generated of sufficient magnitude to urge said roller into said state of stable equilibrium normal to said surface.

These and other aspects and advantages of this invention are more completely described below with reference to the accompanying drawing.

BRIEF DESCRIPTION OF THE DRAWING

FIG. 3 is an elevation view of the right side of the tire stitching device of FIG. 1;

FIG. 4 is an enlarged fragmentary view of a partial horizontal cross section of the tire stitching device taken along line IV—IV of FIG. 5 and showing the stationary frame and the moving frame of the tire stitching device with the control jack, the locking devices, and the end-of-stroke stops of the moving frame;

FIG. 5 is a fragmentary elevation view, partly in section, of the stationary and moving frames shown in FIG. 4 as taken from the side of the tire building drum;

FIG. 6 is a sectional view of the tire stitching device taken along line VI—VI of FIG. 4;

FIG. 10 is an enlarged sectional view of a portion of the tire stitching device as taken along lines X—X of FIG. 2 and which shows a control screw for simultaneously moving the axial carriages back and forth along the moving frame;

FIG. 11 is an enlarged top view of the axial carriages and the rolling-unit supports according to the circled detail XI in FIG. 2, which specifically shows the motor sets for rotating the rolling units;

FIG. 12 is a sectional view of the tire stitching device taken along line XII—XII in FIG. 11;

FIG. 13 is a sectional view of the tire stitching device taken along line XIII—XIII of FIG. 11;

FIG. 14 is a longitudinal sectional view of the tire stitching device taken along line XIV—XIV of FIG. 13;

FIG. 15 is an enlarged top plan view of the rolling units of the tire stitching device corresponding to the circled detail XV in FIG. 2;

FIG. 16 is a perspective view of a segment of the tire stitching device as viewed in the direction of arrow XVI of FIG. 15;

FIG. 21 represents an enlarged top plan view of the profile and orientation cams corresponding to the circled detail XXI in FIG. 2;

FIG. 22 is a sectional view, partly in elevation, of the tire stitching device taken along line XXII—XXII of FIG. 21;

FIG. 23 is a fragmentary sectional view of the tire stitching device taken along line XXIII—XXIII of FIG. 21;

FIG. 24 is a sectional view of the tire stitching device taken along line XXIV—XXIV of FIG. 21;

FIG. 25 is an enlarged front elevation view, corresponding to the detail indicated by arrow XXV in FIG. 2, taken in the direction of arrow XXV in FIG. 26, of the electrical breakers and contacts for monitoring various longitudinal rolling motions;

FIG. 26 is a fragmentary sectional view of the tire stitching device taken along line XXVI—XXVI of FIG. 25;

FIG. 27 is a diagrammatic view of a portion of the tire stitching device shown in one stage of operation during the manufacture of a pneumatic tire tread carcass;

FIG. 28 is a diagrammatic view similar to FIG. 27 but showing said portion of the tire stitching device in another stage of operation;

FIG. 29 is another diagrammatic view similar to FIGS. 27 and 28 but showing said portion of the tire stitching device in still another stage of operation;

FIG. 30 is a diagrammatic view of an alternative embodiment of this invention showing a stitching roller and its guiding system in a position of dynamic disequilibrium; and FIG. 31 represents the position of stable equilibrium of the unit shown in FIG. 30 with the roller oriented perpendicular to the surface to be rolled.

DESCRIPTION OF THE PREFERRED EMBODIMENTS

Figure 1:
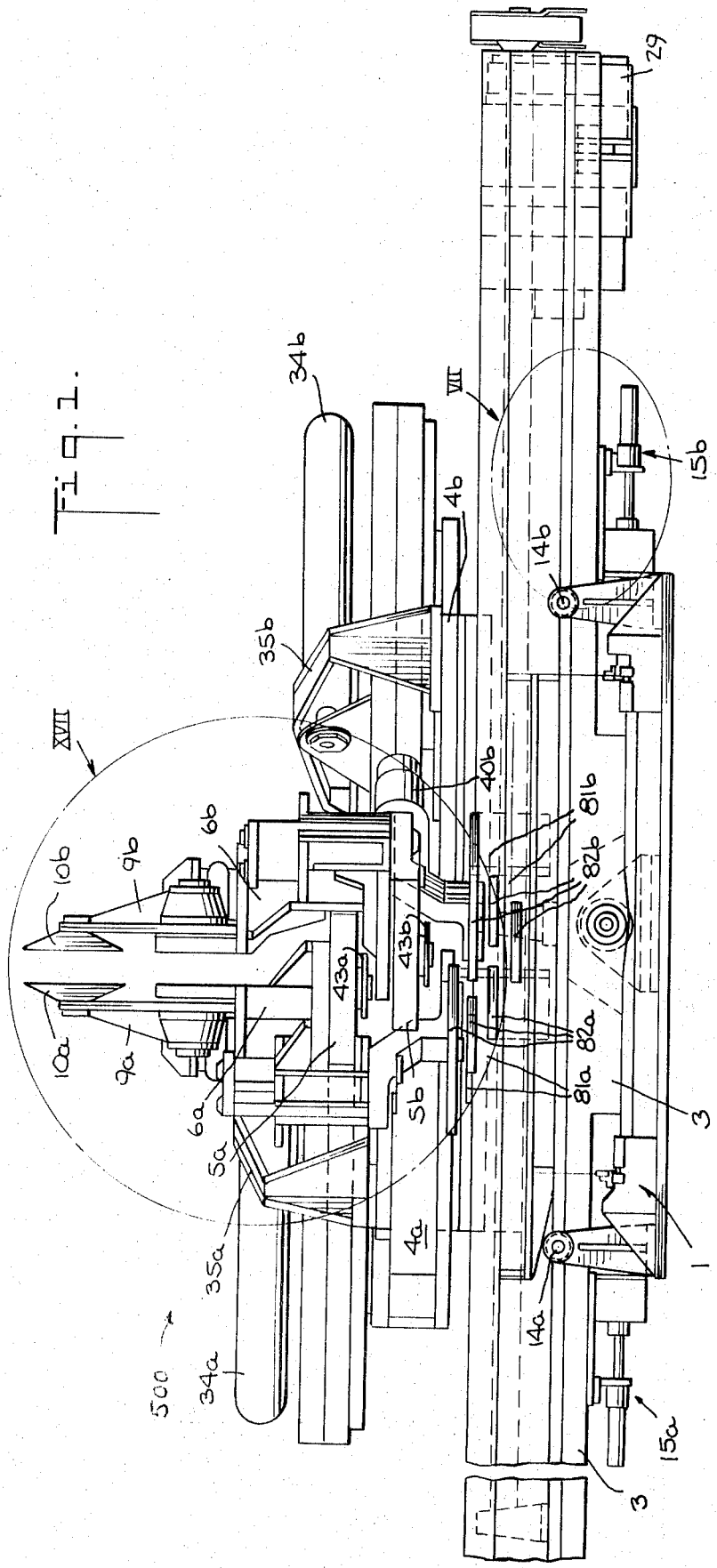
FIG. 1 is a front elevation view of a tire stitching device of this invention as taken from the side of a tire building drum.
Figure 2:
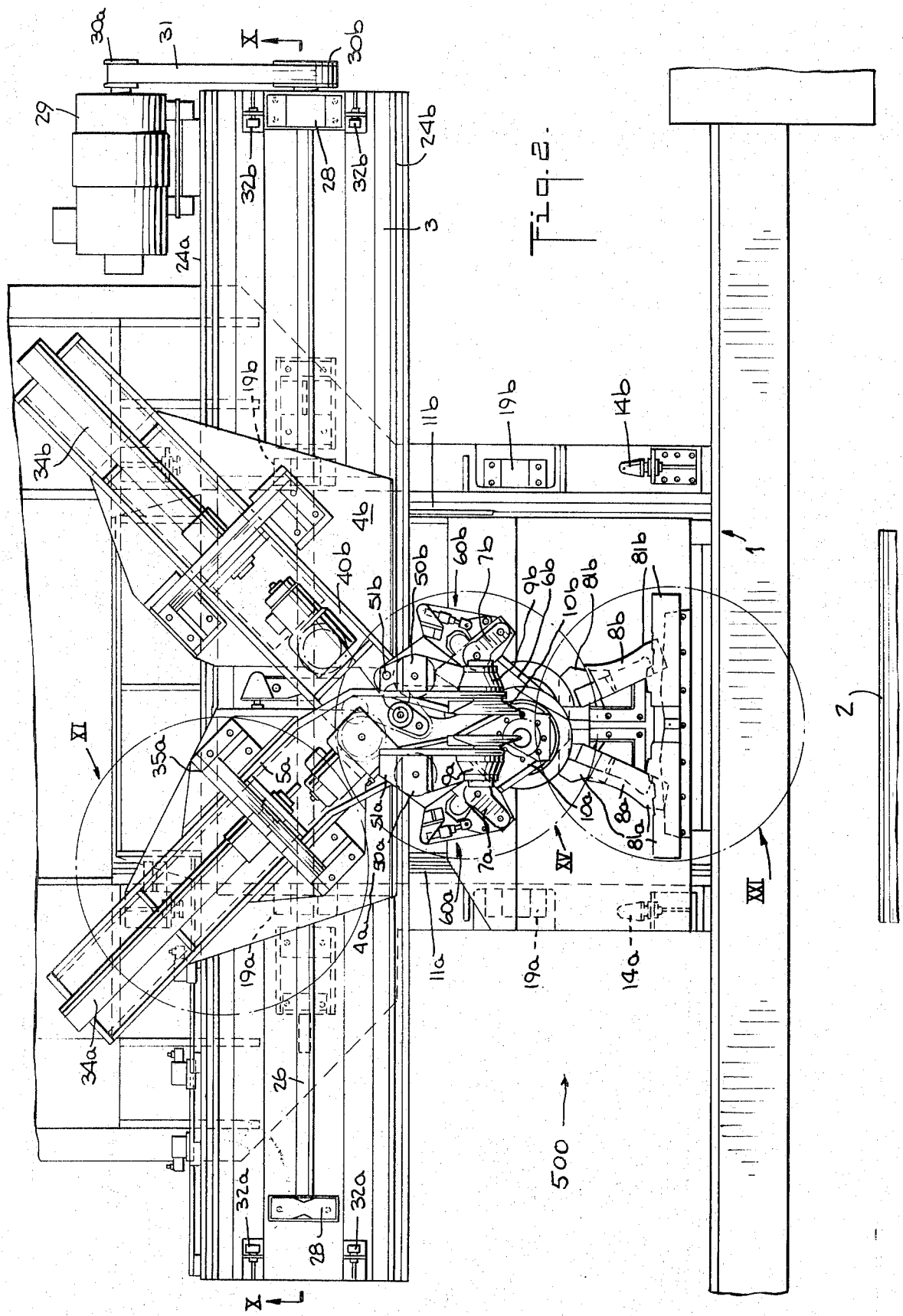
FIG. 2 is a top plan view of the tire stitching device of FIG. 1.

Referring now to the drawings in detail and especially to FIGS. 1–3 thereof, a tire stitching device 500 according to this invention is shown. Tire stitching device 500 may be used on any machine for building pneumatic tire tread coverings, but is preferably intended for use with the single stage tire casing manufacturing machine that is described and illustrated, for example, in French Patent Application No. 71-25784, dated July 13, 1971, now French patent 71.25784, issued Feb. 23, 1973, in the name of the assignee of the present application.

Tire stitching device 500 includes a stationary frame 1 arranged in front of a tire-building drum 2 which is indicated schematically in FIG. 2. Preferably, frame 1 is an essentially rectangular table whose median longitudinal vertical plane substantially coincides with that of the tire-building drum. Tire stitching device 500 further includes a moving frame 3 so as to be able to slide back and forth on the frame 1 in a direction that is substantially perpendicular to the axis of rotation 504 of the tire-building drum 2. Moving frame 3 includes two axial carriages 4a and 4b mounted therein in a manner so as to be shifted back and forth on the frame in a direction substantially parallel to the axis of rotation 504 of the tire-building drum 2. The particular means for movably mounting frame 3 on frame 1 and for mounting axial carriages 4a and 4b on moving frame 3 will be more completely described below.

Tire stitching device 500 further includes the following additional components: two conventional rolling-unit supports 5a and 5b mounted respectively on the two axial carriages 4a and 4b with two associated conventional rolling units 6a and 6b respectively mounted on said rolling-unit supports; two rolling selectors 7a and 7b respectively mounted on the rolling units 6a and 6b and designed together with profile cam sets 8a and 8b, respectively, to assure suitable rolling profiles in a manner more completely described; and two rolling arms 9a and 9b respectively mounted on rolling units 6a and 6b and for respectively carrying two conventional stitching rollers 10a and 10b. The particular means for mounting each of the above described components of tire stitching device 500, as well as such components themselves, will also be more completely described below.

The stationary frame 1 is provided with a pair of longitudinal guide tracks 11a and 11b that are parallel and transversely spaced, and which extend in a direction substantially perpendicular to the axis of rotation 504 of the tire-building drum 2 (FIG. 2). Tracks 11a and 11b are preferably identical and are desirably formed by two precision bars or rails which preferably operate together with endless skids in the form of roller or similar conventional slides 12a, 12b mounted on moving frame 3 (see FIGS. 2, 4 and 5). Thus, moving frame 3 is slidable on stationary frame 1 back and forth along the length of these guide tracks so as to advance and approach tire-building drum 2 or to back up to retreat from the latter.

The position and movement of frame 3 is selectively controlled by a positioner 13, such as a conventional compressed-fluid linear jack (see FIGS. 1 and 3–6). The cylinder of jack 13 is mounted substantially on the median horizontal axis 506 (FIG. 4) of stationary frame 1 and is supported by brackets whose position can be selectively adjusted. The piston rod of jack 13 is attached, at its outer end 510, to a front wall 508 of moving frame 3.

In FIGS. 2 and 6, moving frame 3 is represented in its return position of maximum distance from tire-building drum 2 whereas in FIG. 4, the moving frame is represented in its advanced position of maximum approach toward tire-building drum 2. Thus, it will be seen that moving frame 3 may be shifted between two extreme positions, i.e., one advanced to conduct the rolling and stitching operations and the other returned to start the tire-building machine and leave room for other components and devices necessary during the manufacture of the pneumatic tire-tread covering, such as bead-wire assemblies, a transfer ring for the reinforcing breaker and the tread, as well as the supply systems (all not shown). The travel of moving frame 3 in a direction toward drum 2 is limited by an adjustable stop 14a, whereas the travel of frame 3 in a direction away from drum 2 is limited by an adjustable stop 14b. Stops 14a and 14b are preferably elastically deformable and are mounted at appropriate positions on stationary frame 1 (see FIGS. 1–5).

Figure 7:
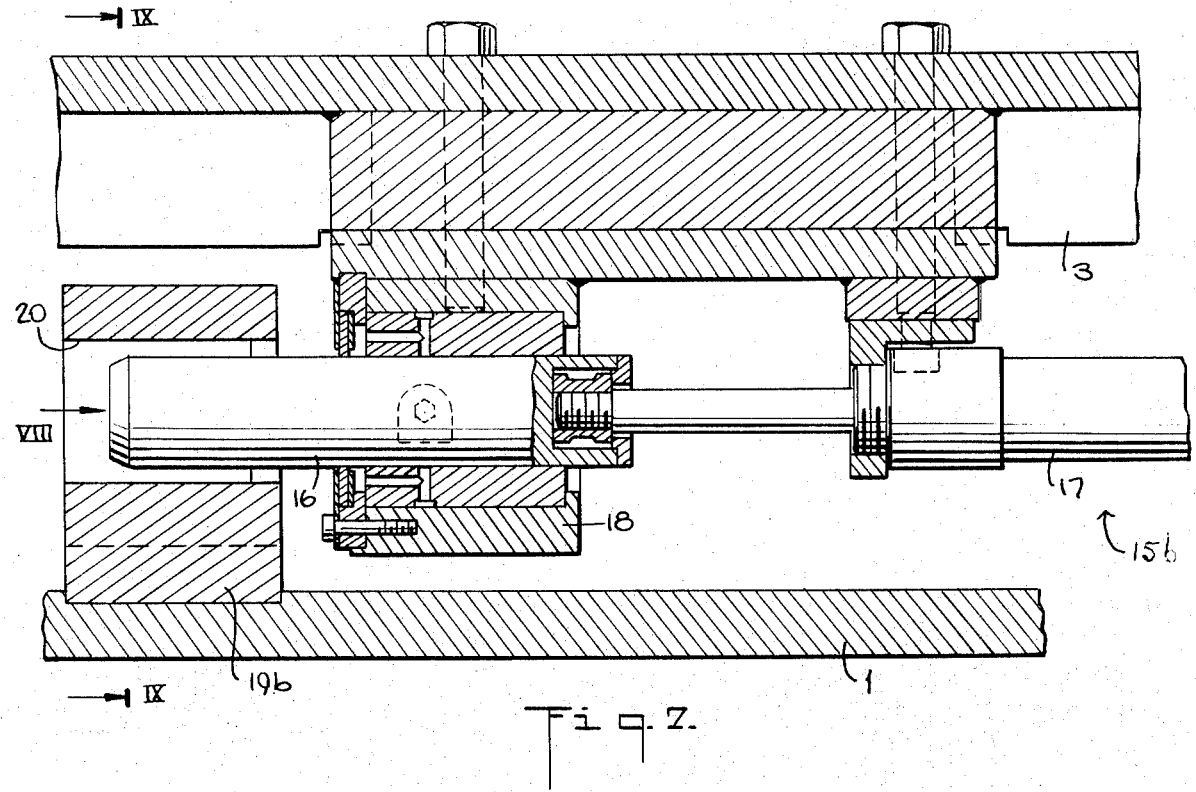
FIG. 7 is an enlarged sectional view of the tire stitching device taken along line VII—VII of FIG. 4 and showing a locking device of the moving frame corresponding to the circled detail VII in FIG. 1.

Tire stitching device 500 further includes at least one, and preferably two, conventional locking devices 15a and 15b (FIGS. 1 and 4) designed to lock or immobilize the moving frame 3 in each of its two extreme opposite positions. Locking devices 15a and 15b are advantageously located on opposite longitudinal sides of moving frame 3 (see FIGS. 1, 4, 5). Each locking device 15a and 15b has a centering pin 16 which is preferably cylindrical but having a chamfered free end (see FIG. 7). Each pin 16 is connected to, and extends coaxially from, the free end of the piston rod of a compressed-fluid jack 17 (FIG. 4). Further, each pin 16 is slidable within its respective locking device, being guided by a conventional guide bushing 18. With reference to FIG. 7, it will be seen that jack 17 and bushing 18 are mounted to the underside of moving frame 3.

Each pin 16 may be selectively inserted into one of two locking units built into stationary frame 1 adjacent one side of moving frame 3. More specifically, a pair of locking units 19a, 19a' are mounted at spaced locations adjacent one side of moving frame 3 and another pair of locking units 19b, 19b' are mounted adjacent the other side of the moving frame in respective alignment with units 19a, 19a'. Locking units 19a, 19a' and 19b, 19b' cooperate with pins 16 to define the extreme front and back positions, respectively, of the moving frame.

Figure 9:
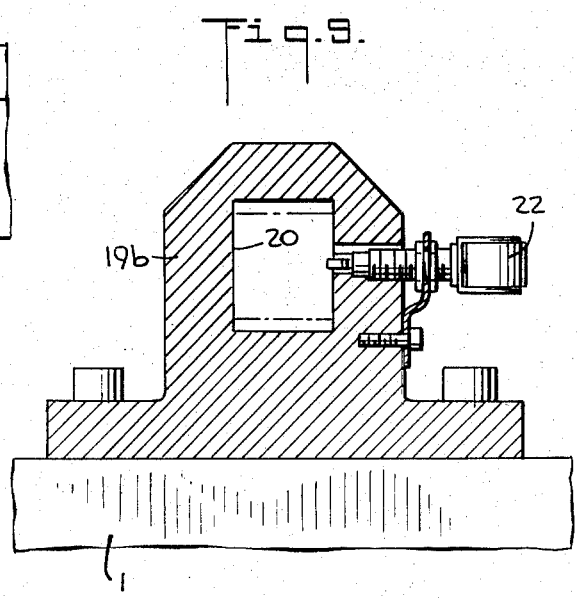
FIG. 9 is a fragmentary sectional view of the tire stitching device as shown in FIG. 7 taken along line IX—IX of FIG. 7.

Referring to FIGS. 3 and 9, it will be seen that each locking unit has a port 20 which is preferably rectangular in cross section and is sufficiently deep so that the corresponding pin 16 may be received therein. The vertical extent of port 20 is greater than that of the corresponding pin 16 to provide for a bilateral transverse play of the pin in the port. Further, port 20 of each locking unit 19a, 19a' and 19b, 19b' is chamfered complementary to the chamfered free end of the respective pin 16 for engagement therewith as it is inserted to thereby provide for an accurate centering of the pin in the locking unit. This makes it possible to achieve accurate positioning of moving frame 3 relative to tire building drum 2.

Figure 8:
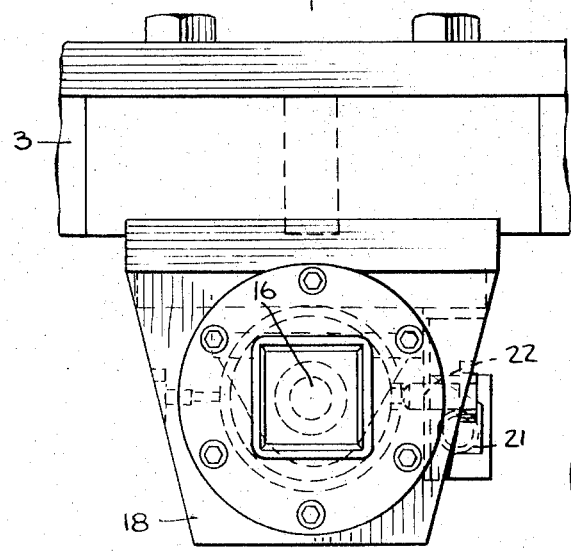
FIG. 8 is an end view of the tire stitching device as shown in FIG. 7 viewed in the direction of arrow VIII in FIG. 7.

Each locking jack 17 is matched with a conventional pneumatic sensor 21 (FIGS. 4 and 8) or similar unit that can be actuated by a moving thrust bearing 21a carried by the pin 16 or the rod of the jack 17 and actuated when the pin 16 moves to the retracted or unlocked position, i.e., to the return position of the jack rod. Likewise, a travel-limit switch 22 is mounted on each locking unit 19a, 19a' and 19b, 19b' so as to penetrate into the port 20 of the latter to be activated by the pin 16. Similarly, a pneumatic sensor 23 (FIGS. 4–6) is built into the moving frame 3 and is arranged to be brought into contact with a stationary thrust bearing that is made of, for example, the support of one of the rear stops 14b. The above-indicated pneumatic sensors serve to monitor pneumatically the positions of the various mechanical components in order to facilitate control of pneumatic operations, whereas the above-indicated travel-limit switches monitor the positions of the various mechanical components in order to facilitate control of electrical operations.

Referring to FIGS. 2, 3 and 6, moving frame 3 is provided with a pair of parallel rails 24a and 24b which extend in the longitudinal direction of moving frame 3, i.e., essentially parallel to the axis of rotation of tire-building drum 2. Rails 24a and 24b respectively cooperate with two corresponding pairs of conventional roller or other guide slides, one of which pairs is shown at 25a and 25b. One of each pair of guide slides 25a and 25b is carried by axial carriage 4a mounted on moving frame 3 and the other pair is carried by axial carriage 4b mounted on moving frame 3. Thus, axial carriages 4a and 4b are capable of sliding back and forth relative to moving frame 3 (see FIGS. 2, 3 and 6).

Both axial carriages 4a and 4b are driven simultaneously and synchronously in opposite directions concentric with their axes by a common essentially horizontal control screw 26 that preferably consists of a double-thread reverse-pitch rod 26 (see FIGS. 1–3) having two sections 26a and 26b (FIG. 10). Sections 26a and 26b are respectively screwed into corresponding matched nuts 27a, 27b, that are built into axial carriages 4a and 4b, respectively. Control screw 26 is supported by three shaft bearings 28 (two at the extremities of the screw and one at the center) built into moving frame 3 at the appropriate locations (See FIG. 10). Referring to FIG. 2, control screw 26 is rotated by an electric motor 29 through a pulley drive 30a, 30b and a V-belt 31. The two axial carriages 4a and 4b may thus be moved symmetrically relative to the vertical median plane of the tire stitching device whereby this plane is normal to the axis of rotation of tire-building drum 2. The two opposite ends of the moving frame 3 are respectively provided with travel-limit stops 32a and 32b for limiting the outward movement of the axial carriages. Stops 32a and 32b are preferably of the progressive or elastic type.

Referring now to FIGS. 11–14, it will be seen that carriages 4a and 4b respectively carry rolling unit supports 5a and 5b by means of roller slides 33a and 33b so that the rolling-unit supports can be moved back and forth relative to axial carriages 4a and 4b respectively, under the effect of a pair of compressed-fluid linear jacks 34a and 34b. The housings or cylinders of jacks 34a and 34b are built into the corresponding axial carriages 4a and 4b by means of bridge structures 35a and 35b, respectively (see also FIG. 2), wherein their piston rods are respectively attached to the corresponding rolling-unit supports 5a and 5b by conventional mounting assemblies. Conventional limit switches 36a and 36b are provided on axial carriages 4a and 4b, respectively, and are activated by cams 36c built into rolling-unit supports 5a and 5b.

Figure 17:
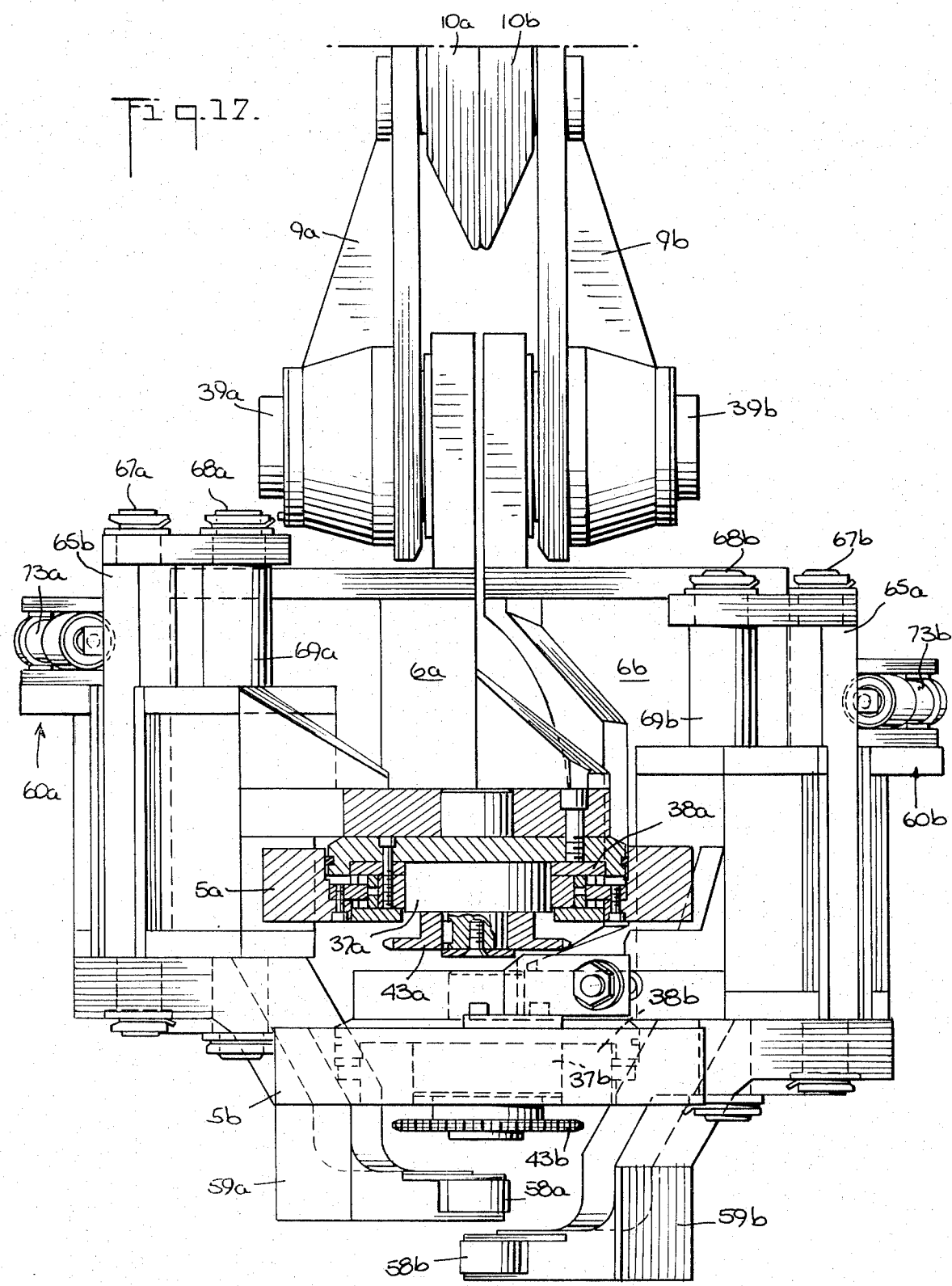
FIG. 17 is an enlarged fragmentary view of the rolling units and rolling arms corresponding to the circled detail XVII in FIG. 1, which specifically shows the pivot assembly of the rolling units.

As FIGS. 1 and 17 specifically show, rolling-unit supports 5a and 5b are vertically displaced from one another so that their respective front ends may be brought into superposed relation with one another thereby enabling rollers 10a and 10b to be brought together in contacting relation, as shown in FIG. 17.

Rolling units 6a and 6b are mounted by vertical pivots 37a and 37b, respectively, in corresponding combined roller bearings 38a and 38b, respectively, that are respectively carried by rolling-unit supports 5a and 5b. Thus, rolling units 6a and 6b are supported so as to be able to revolve around an essentially vertical axis of rotation (see FIG. 17). Rolling units 6a and 6b are designed to be overlapped with each other thereby enabling rollers 10a and 10b to be brought together in contacting relation, as shown in FIG. 17. Rolling units 6a and 6b carry hinge pins 39a and 39b, respectively, about which rolling arms 9a and 9b, respectively, are mounted for pivotal movement. The rolling arms 9a and 9b, in turn, carry respective rollers 10a and 10b.

Referring to FIGS. 11, 15 and 17, rotation of rolling units 6a and 6b is accomplished, for each rolling-unit, by a gear motor 40a and 40b mounted respectively on rolling-unit supports 5a and 5b. The output pinions 41a and 41b of gear motors 40a and 40b are connected, respectively, through drive chains 42a and 42b to driven gear wheels 43a and 43b, respectively. Wheels 43a and 43b are coaxially built into the respective pivots 37a and 37b of the rolling-unit supports 5a and 5b. Each drive chain 42a and 42b preferably passes over a conventional chain tension adjuster 44a and 44b, respectively, that is swivel-mounted on the corresponding rolling-unit support and drive chain 42b preferably also passes over a free idler gear 45 mounted on rolling-unit support 5b.

Referring to FIGS. 15 and 16, each rolling-unit 6a and 6b is equipped with a pair of cams 46a and 46b, respectively, designed to respectively activate a pair of limit switches 47a and 47b that are respectively mounted on rolling-unit supports 5a and 5b. Rolling-unit supports 5a and 5b each also have a stop 48a and 48b, respectively, which is preferably elastically deformable and is designed to make contact with the pivoting rolling-units 6a and 6b, respectively, at the end of the angular travel of the latter. In addition, rolling-unit support 5a also has a limit switch 49 that is activated by the pivoting rolling-unit 6a at the end of its angular travel.

With reference to FIGS. 3, 15 and 17, rolling arms 9a and 9b can pivot or "swing" around their respective axes of rotation 39a and 39b, such swinging motion being imparted by appropriate controls that consist of, for example, conventional pneumatic cushions or expansible chambers 50a and 50b, respectively (FIGS. 3 and 15). This swinging, however, is limited by adjustable stops 51a and 51b and is monitored by limit switches or contacts 52a and 53a, and 52b and 53b, the switches 53a and 53b being respectively mounted on the rolling arms 9a and 9b and the switches 52a and 52b being respectively mounted on the rolling units 6a and 6b. Switches 52a, 53a and 52b, 53b are activated by corresponding cams 54a, 55a and 54b, 55b, the cams 54a and 54b being respectively mounted on corresponding rolling arms 9a and 9b and the cams 55a and 55b being respectively mounted on rolling-units 6a and 6b.

The pivoting motion of each rolling-unit 6a and 6b is additionally monitored by electrical contacts 56a and 56b, respectively, on the rolling-unit supports 5a and 5b and are activated by appropriate cams 57a and 57b on the corresponding rolling-unit (FIG. 15). Each pneumatic cushion 50a and 50b (FIG. 3) is placed between a part of the respective rolling arm 9a and 9b (to form a lever) and the corresponding rolling-unit 6a and 6b to make the rolling arm involved swing in an essentially vertical plane. Each adjustable stop 51a and 51b limits the amount of swinging of the respective rolling arm in both directions.

Referring now to FIGS. 2, 3, 17 and 18, each rolling-unit 6a and 6b is provided with a feeler 58a and 58b, respectively, which preferably is comprised of a rotary follower-roller. Each follower-roller 58a and 58b is designed to follow the active contour of an associated profile cam 8a and 8b. More specifically, each follower-roller 58a and 58b revolves around an essentially vertical axis and is preferably arranged so that the point of tangential contact between said follower-roller and the associated profile cam, as well as the point of application of the corresponding stitching roller 10a and 10b onto the tire-tread covering, are located essentially on the same vertical axis (see FIG. 3).

Figure 18:
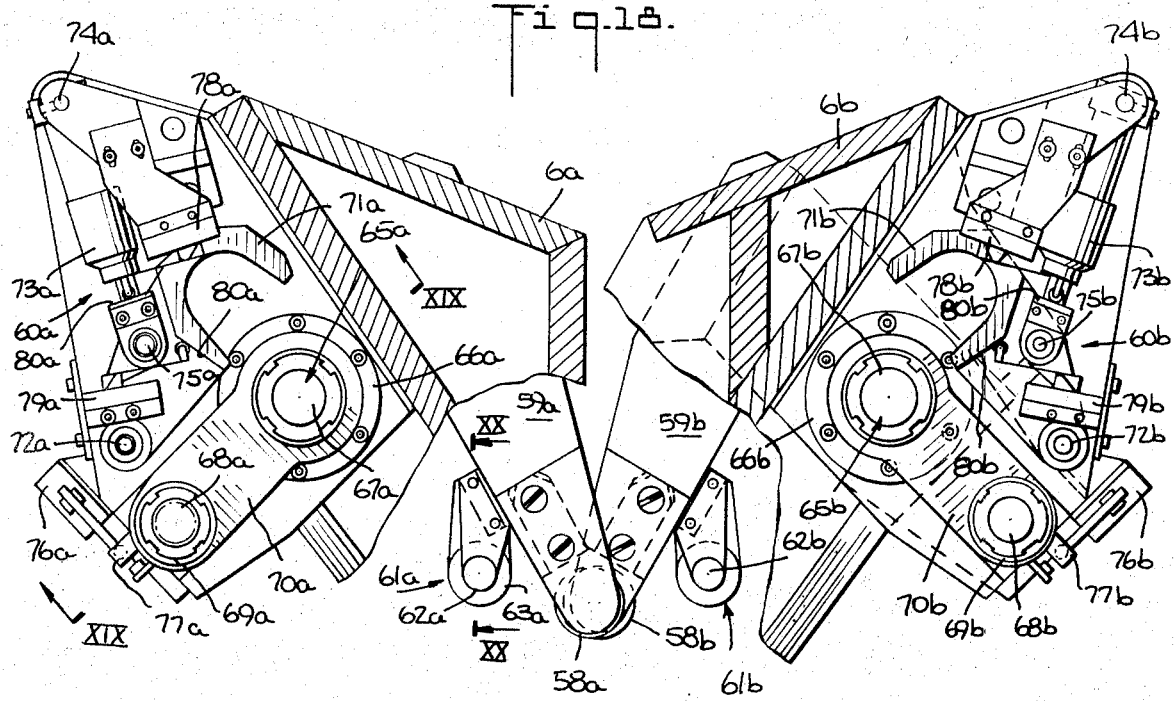
FIG. 18 is a fragmentary view of the rolling selectors and cam-followers mounted on the rolling units of the tire stitching device, corresponding to the circled detail XVIII in FIG. 3.
Figure 20:
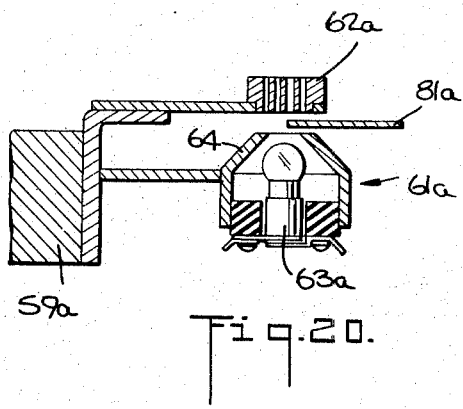
FIG. 20 is an enlarged sectional view of the tire stitching device as shown in FIG. 18 taken along line XX—XX of FIG. 18 and which shows an orientation cam-follower in the form of a photocell detector.

With reference to FIG. 18, follower-rollers 58a and 58b are respectively carried by follower-roller carrier arms 59a and 59b which are respectively built into pivoting rolling units 6a and 6b, but whose vertical position or height level can be selectively adjusted as desired by a conventional rolling-cam selector mechanism 60a and 60b, respectively (see FIGS. 2, 15 and 17-19). Each follower-roller carrier arm 59a and 59b also supports a detector 61a and 61b, respectively, designed to follow the contour of a respective predetermined orientation cam 81a and 81b (FIG. 20). Thus, each detector 61a and 61b is positioned by its corresponding carrier arm 59a and 59b by means of the above-indicated selector mechanism 60a and 60b, respectively (see FIGS. 18 and 20).

As exemplified in FIG. 20, each detector 61a and 61b comprises, for example, four photocells 62a and four photocells 62b that are exposed to the radiation produced by luminous sources 63a and 63b, respectively. The luminous sources preferably are each comprised of an electric lamp or lightbulb placed in a suitable housing 64 which is provided with an opening 64a through which a light beam may pass. Between each luminous source 63a and 63b and the associated photocells 62a and 62b there is an orientation cam 81a and 81b, respectively, (FIG. 20), wherein the light beam emitted by the luminous source is essentially tangent to the contour of the active profile of said orientation cam so as to follow the latter.

As indicated above, there are multiple sets of orientation and profile cams which correspond to different rolling operations for the various parts of the tire-tread covering during its manufacture, with the number of such cams advantageously corresponding to that of the rolling operations. The particular orientation and profile cams included in cam sets 8a and 8b are described below with reference to FIGS. 1–3 and 21–24.

There are usually three rolling operations in, for example, a radial ply tire stitching process, i.e., "flat" rolling of the cylindrical ring of the carcass built on the tire-building drum 2 before expansion of the drum, and then, after expansion of the drum, rolling of the side walls of the carcass and rolling of the tread, the tread generally being combined with a reinforcing breaker. There are thus advantageously three sets of cams which are preferably superimposed relative to each other. More specifically, and as shown in FIGS. 1, 3 and 22–24, the orientation cams are designated generally by reference numbers 81a and 81b, whereas the profile cams are designated generally by reference numbers 82a and 82b.

FIG. 22 specifically shows the three sets of superimposed cams, i.e., one pair of profile cams 82a and 82b, numbered as 83a and 83b for purposes of distinction, for flat-rolling of the cylindrical carcass ring with an associated pair of orientation cams 81a and 81b, distinctively numbered 83'a, 83'b; another pair of profile cams 82a and 82b, numbered for easy identification as 84a and 84b, for rolling the carcass sidewalls with an associated pair of orientation cams 81a and 81b, numbered 84'a and 84'b; and another pair of profile cams 82a and 82b, numbered 85a and 85b, for rolling the tire tread with an associated pair of orientation cams 81a and 81b, distinctively numbered 85'a and 85'b. The respective levels of these three cam stages are shifted to adapt to that of upper rolling unit 6a and lower rolling unit 6b, respectively.

Referring to FIGS. 17–20, it will be seen that rolling selectors 60a and 60b have, for each pair of profile-cam follower-rollers 58a and 58b and orientationcam detectors 61a and 61b, a positioning servo motor (not shown) for positioning rollers 58a and 58b and detectors 61a and 61b with respect to the three successive levels of the above-indicated sets of cams. On each rolling unit 6a and 6b, selectors 60a and 60b, respectively, have a compressed fluid jack 65a and 65b, each of which is preferably of the dual-action, linear type. Jacks 65a and 65b include cylinders 66a and 66b, respectively, built into the corresponding rolling unit 6a and 6b, and a piston rod 67a and 67b, respectively, that is attached to its lower end to the associated follower-roller carrier arm 59a and 59b.

Each follower-roller carrier arm 59a and 59b is additionally connected to the lower end of a guide pin 68a and 68b, respectively, which is preferably square and is essentially parallel to the associated piston rod 67a and 67b. Guide pins 68a and 68b are longitudinally slide-mounted in guide bushings 69a and 69b, respectively, that are built into the corresponding rolling unit 6a and 6b, as preferably are the associated jack cylinder 65a and 65b. The piston rod 67a and guide pin 68a are connected at their upper ends by a spacer plate 70a, and the piston rod 67b and the guide pin 68b are connected at their upper ends by a spacer plate 70b.

The two extreme vertical "end-of-travel" positions of each follower-roller carrier arm 59a and 59b, which respectively correspond to the upper position of the sets of cams for flat rolling of the carcass ring and the lower position of the sets of cams for tread rolling, are defined when the follower-roller carrier arm 59a and 59b that is moving up or down arrives at the level of the corresponding cam set. More specifically, referring to FIGS. 18 and 19, the extreme upper position is defined, for example, by the thrust of the upper end of the particular follower-roller carrier arm 59a and 59b against the relatively stable structure supporting it, i.e., against the adjacent lower end of the associated jack cylinder 65a and 65b; whereas the extreme bottom position is defined by the thrust of the particular spacer plate 70a and 70b against the adjacent upper end of the associated jack cylinder 65a and 65b.

Figure 19:
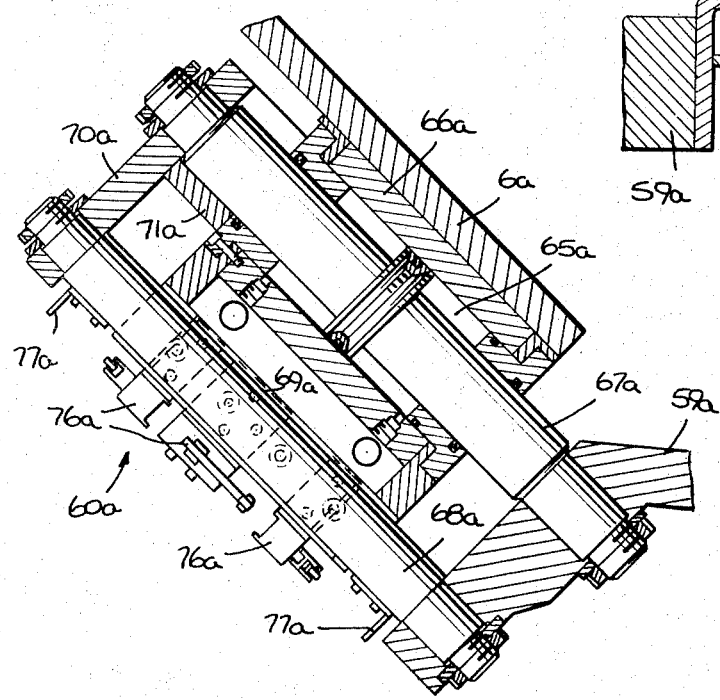
FIG. 19 is a sectional view of the tire stitching device taken along line XIX—XIX of FIG. 18, which specifically shows a jack for vertical displacement of the cam-followers.

Still referring to FIGS. 18 and 19, the third, or intermediate, position of each follower-roller carrier arm 59a and 59b that corresponds to the intermediate set of cams for rolling the carcass side walls is advantageously defined by a retractable or detachable stop 71a and 71b, respectively. Each stop 71a and 71b can be inserted selectively between the associated spacer plate 70a and 70b and the upper end of the associated jack cylinder 66a and 66b. Each stop 71a and 71b preferably comprises a U-shaped strap or similar component that can encircle or grasp the upper outlet end of the corresponding piston rod 67a and 67b. The strap thus forms the free end of a pivoting lever that is hinged by its opposite end to an axis of rotation 72a and 72b, respectively, that is essentially parallel to the associated piston rod 67a and 67b and is supported by the corresponding rolling unit 6a and 6b.

Each retractable stop 71a and 71b can be shifted between its two extreme positions, i.e., the retracted position and the position in which it grasps the associated piston rod, by a compressed-fluid jack 73a and 73b, respectively, whose cylinder base is hinged at point 74a and 74b, respectively, to stationary structure that is built into the corresponding rolling unit 6a and 6b. The outlet end of the piston rod of each of jacks 73a and 73b is pivoted at a point 75a and 75b, respectively, to the associated detachable stop 71a and 71b. Detachable stops 71a and 71b are represented in their retracted position in FIG. 18 and in their piston rod grasping position in FIG. 19.

Again referring to FIGS. 18 and 19, a group 76a and a group 76b of relatively stationary limit switches are built into the associating rolling unit 6a and 6b and can be actuated by associated groups of cams 77a and 77b which are fixed to associated moving guide pins 68a and 68b. Switches 76a and 76b monitor the motions of guide pins 68a and 68b to insure that they have been correctly executed and to initiate further desired sequences of operations. Likewise, the operation of each retractable stop 71a and 71b is monitored by two limit switches 78a/78b, and 79a/79b, respectively, that are relatively stationary and can be actuated by corresponding pairs of moving inclines 80a and 80b, respectively, that are built into the associated detachable stops 71a and 71b and which respectively define the retracted and grasping positions of the latter.

Thus, at each of the stages of operation selected by selectors 60a and 60b, each follower-roller 58a and 58b and each detector 61a and 61b can come into contact with a particular cam that will correspond to the rolling profile selected and to the orientation suitable for the latter, whereby rollers 58a and 58b roll on the set of profile cams 82a and 82b (83a, 83b, 84a, 84b, 85a and 85b) while the detectors 61a and 61b follow the corresponding orientation cams 81a and 81b (83'a, 83'b, 84'a, 84'b, 85'a and 85'b).

FIGS. 25 and 26 illustrate a detailed view of the limit switches that monitor the longitudinal rolling motion of axial carriage 4a. A similar set of limit switches, not shown, is utilized in connection with axial carriage 4b. More specifically, moving frame 3 has, along the length of one of its longitudinal sides, a series of electrical limit switches (90a/90b, 94a/94b/94c and 96a/96b) arranged in three superposed stages. The stages correspond respectively, from bottom to top, to the control for flat-rolling of the cylindrical carcass ring, the control for rolling the carcass sidewalls, and the control for rolling the thread. These electrical contacts advantageously can have their positions selectively adjusted and are respectively mounted on essentially horizontal slides or bars 86, 87 and 88 that are attached to moving frame 3.

In FIG. 25, the reference number 89 designates the position, relative to the limit switches in that figure, of the axis of the cams 8a and 8b, i.e., 81a/81b and 82a/82b, that control rollers 10a and 10b, this being the position that cam 95 (FIG. 26) would occupy when the rollers 10a and 10b are axially closest to one another. The set of electrical contacts for controlling flat-rolling includes, for each axial carriage 4a and 4b, two limit switches 90a and 90b that are spaced apart on bar 86. Switches 90a and 90b respectively monitor the beginning and the end of the flat-rolling operation by being respectively actuated by corresponding cams 91 on the moving carriage 4a and 4b involved. Each of these roller contacts preferably has an arrow or pointer 92 that serves as an indicator to mark the position of the electrical contact involved on the scale of a slide 93 or a similar object attached to moving frame 3.

The set of electrical contacts for controlling the rolling of the carcass sidewalls, includes, for each axial carriage 4a and 4b, three limit switches 94a, 94b and 94c, that are spaced apart on bar 87 and which respectively monitor the predetermined minimum axial displacement of rollers 10a and 10b, the end of the sidewall rolling operation, and the beginning of the sidewall rolling operation. Switches 94a, 94b and 94c are actuated by corresponding cams 95 (FIG. 26) on the axial carriage 4a and 4b involved. Each of limit switches 94a, 94b and 94c also has a pointer 92 that locates the position of the electrical contact involved relative to the scale of a slide 95a on the moving frame 3.

The set of electrical contacts for controlling the tread-rolling operation includes, for each axial carriage 4a and 4b, two spaced limit switches 96a and 96b mounted on bar 88 and which respectively monitor the beginning and end of tread-rolling after being respectively actuated by corresponding cams 97 (FIG. 26) on the axial carriage 4a and 4b involved. Limit switches 96a and 96b each also has an indicator 92 that marks its position on slide scale 95a. Finally, there is a limit switch 96 on moving frame 3 essentially on the same level with bar 88 and which is designed to permit the retraction of the rolling jacks relative to the axis of the tire-building machine. The limit switch 96 is activated by a stop 99 (FIG. 26) on the axial carriage 4a and 4b involved.

Tire stitching device 500 additionally includes a conventional electronic servo system (not shown) for analyzing signals transmitted by photocell detectors 61a and 61b and for generating command signals in response thereto for controlling electric motors 40a and 40b which, as will be recalled, are designed to respectively rotate rolling units 6a and 6b. Thus, at any moment in time, the correct relative angular positioning of rollers 10a and 10b may be achieved. Such an electronic servo system is well known in the art and thus will not be described in detail herein.

The operation of tire stitching device 500 is now described with references to all of the Figures and, in particular FIGS. 27–29. At the inactive idle position, stitching device 500 is in the position represented in FIGS. 1–3. In this idle position, rollers 10a and 10b are at a minimum spacing therebetween and are arranged symmetrically on either side of the median transverse vertical plane of the tire-building drum 2 (position 100 in dash-dot lines in FIG. 27). In this position, stitching device 500 is retracted at maximum distance from the tire-building drum.

First, and with reference to FIGS. 18–20, the rolling cycle is selected by actuating jacks 65a and 65b and detachable stops 71a and 71b. This is done to obtain the correct height positioning of follower-rollers 58a and 58b so that the latter may be operated with profile cams 82a and 82b, which cams correspond to the profile of the selected rolling, as described above. Simultaneously, axial carriages 4a and 4b are guided to a rolling "start" position for the rolling profile selected.

Referring to FIGS. 1–4, moving frame 3 is then unlocked and jack 13 is actuated, so that the moving frame travels forwardly toward the tire-building drum. It will then be locked again by locking devices 15a and 15b. Rolling jacks 34a and 34b are then actuated and follower-rollers 58a and 58b move into contact with profile cams 82a and 82b. Rolling jacks 34a and 34b control the linear movement of rolling units 6a and 6b and thus the linear position of rollers 10a and 10b. Detectors 61a and 61b, which are designed to cooperate with orientation cams 81a and 81b to control the angular movement of rollers 10a and 10b, are then actuated. As soon as the correct angular orientation is achieved, rollers 10a and 10b are applied to the tire by pressurizing pneumatic cushions 50a and 50b.

The tire rolling and stitching operation then begins by rotating axial-travel motor 29 to move axial carriages 4a and 4b at a speed suitable for the rolling profile selected, and in the appropriate direction. During the back-and-forth motion of axial carriages 4a and 4b, rolling jacks 34a and 34b remain under pressure and force follower-rollers 58a and 58b to remain in contact with profile cams 82a and 82b. Detectors 61a and 61b, which operate together with orientation cams 81a and 81b, control motors 40a and 40b to obtain the correct relative orientation of rollers 10a and 10b at each moment. Thus, during the entire tire rolling and stitching operation, rollers 10a and 10b faithfully track the profile imparted by profile cams 82a and 82b and are continuously oriented substantially perpendicular to the surface of the carcass or the tire tread covering by orientation cams 81a and 81b, in the manner above described. At the end of the rolling operation, all components are returned to their original position to be ready for starting a new rolling cycle.

In FIG. 27, arrows $F_1$ to $F_8$ successively show the various motions or displacements made by rollers 10a and 10b to successively accomplish an advance of the rolling assembly, a flat-rolling operation for a carcass ring 101 mounted on tire-building drum 2, a resetting of rollers 10a and 10b to minimum axial displacement, and a returning of the rolling assembly to a "start" position. In FIG. 28, arrows $F_9$ to $F_{13}$ indicate the various motions made by rollers 10a and 10b to successively accomplish an advance of the rolling assembly, performance of the operation for rolling tread 102, and a resetting of the rollers to minimum axial displacement. Finally, in FIG. 29, arrows $F_{14}$ to $F_{20}$ respectively indicate the various successive motions made by rollers 10a and 10b to perform a rolling operation of the carcass sidewall 103, to reset said rollers to a relative position of minimum axial displacement, and to return the rolling assembly to a "start" position.

FIGS. 30 and 31 concern the particular case in which tire stitching device 500 has been modified to include only profile-defining cams 82 while, nevertheless, making it possible to accomplish an automatic orientation of each roller 10 so as to arrange it substantially normally to the surface to be rolled. Such a modified tire stitching device would not have detectors and positive positioning of rolling units 6a and 6b, such as by orientation cams 81a and 81b, detectors 61a and 61b to follow such orientation cams, motor reduction gears 40a and 40b, and chain drives 41a, 42a, 43a and 41b, 42b, 43b. In describing the device of FIGS. 30 and 31, subscripts will be deleted from all reference numerals for purposes of simplicity.

In the system illustrated in FIGS. 30 and 31, according to which the device has only cams for rolling-profile definition, there is an automatic orientation of each roller 10 perpendicular to the respective profile cam 82, and thus to the surface of the tire to be rolled and stitched. Such automatic orientation of each roller is a result of the relative mutual positions of the thrust axis of the associated rolling jack 34, the vertical axis of rotation of the rolling unit 6, and the axis of rotation of the associated cam roller 58, which follows the associated profile cam 82. Actually, in the systme of FIGS. 30 and 31, the thrust axis of each rollling jack 34 passes through the vertical axis of rotation of associated rolling unit 6. In addition, this axis of rotation of each rolling unit 6 passes through the point of tangential contact between the associated roller 10 and the tire surface being rolled. Finally, the axis of rotation of each profile-cam roller 58 is located in the plane of the associated roller 10, but is shifted to the rear relative to the vertical axis of rotation of the associated roller unit 6.

The above relationship is represented schematically in FIG. 30, wherein the thrush axis $x$-$x'$ of rolling jack 34 passes through the line O of the axis of rotation of the corresponding rolling unit 6. In contrast, the line O' of the axis of rotation of profile-cam roller 58 is located in the plane of the side of roller 10, separated from line $y$-$y'$ by an amount equal to the radius of a profile-cam roller 58.

In any of the positions represented in FIG. 30, the forces involved are as follows: (1) The thrust force $\vec{F}$ of the rolling jack 34 applied at O; and (2) The reaction $\vec{R}$ of profile cam 82 against cam roller 58, whereby this reaction is normal to the cam and the line of action which passes through line O', where it is assumed that it is applied. Further, the value of reaction $\vec{R}$ is equal to the value of force $\vec{F_1}$, which is the component of force $\vec{F}$ that is directed perpendicular to the surface of profile cam 82.

There are thus two forces acting on rolling unit 6. The reaction force $\vec{R}$ forms, with component force $\vec{F_1}$, a couple whose moment is $\vec{F_1} \cdot OH$ where OH is the length of the force arm between forces $\vec{R}$ and $\vec{F_1}$. This couple tends to revolve rolling unit 6 around its O axis. Force $\vec{F}$ tends to shift point O along the length of $x$-$x'$ axis.

In the modified tire stitching device of FIGS. 30 and 31, each rolling unit 6 is freely rotatable around its vertical axis represented by line O. In addition line O can shift along the $x$-$x'$ axis since rolling jack 34 is not at the extreme end of its stroke. The position represented in FIG. 30 therefore, is not a position of stable equilibrium, but a position of dynamic disequilibrium.

Under the action of the above-indicated couple, each rolling unit 6 restores itself to its position of stable equilibrium, for which said couple, upon acting on the rolling unit, becomes zero, i.e., the distance $\overline{OH}$ becomes zero and segment $\overline{OO'}$ becomes perpendicular to the surface of profile cam 82. At the same time line O, which is acted on by force $\vec{F}$, arrives at position O''. Everything is thus in the position of stable equilibrium represented in FIG. 31, in which lines O and O'' are merged and segment $\overline{OO'}$ is perpendicular to the contour of profile cam 82 as represented by line $y$-$y'$. In addition, $\vec{R} = \vec{F_1}$. The $\vec{F_2}$ component of force F, which is transverse to thrust axis $x$-$x'$ of rolling jack 34, is balanced by the reaction of the guide slide rolling jack 34. Since segment $OO'$ is in the plane of roller 10, the position of equilibrium is that at which the roller is perpendicular to profile cam 82, and thus also perpendicular to the surface to be rolled. The system is thus always automatically placed in this equilibrium position.

Although the invention has been described with respect to a number of specifically described and illustrated embodiments, the invention is not to be so limited. Rather, the invention is deemed to include obvious modifications and variances to such embodiments.

Having thus described our invention, what we claim and desire to protect by Letters Patent is:

1. A tire stitching apparatus for rolling and stitching the various surfaces of a tire mounted on a tire building drum, the apparatus comprising:
  a. at least one stitching roller;
  b. a profile-defining cam having a peripheral edge configuration for defining the path and penetration of said roller over a surface to be rolled;
  c. first follower means in positive mechanical contact with said profile-defining cam for following the peripheral edge of said profile-defining cam;
  d. means supporting said roller and responsive to said first follower means for positively guiding said roller over said tire surface along said predetermined path at said desired depth of penetration; and
  e. means, including an orientation-defining cam having a peripheral edge configuration for defining the angular orientation of said roller relative to said surface to be rolled and second follower means for following the peripheral edge of said orientation-defining cam for control of the orientation of said roller, for continuous orienting said roller at a substantially normal angle of incidence relative to said tire surface as said roller is guided over said tire surface by said supporting means.

2. The tire stitching apparatus of claim 1, wherein there are at least two stitching rollers and wherein there are for each roller:
 a. a profile-defining cam having a peripheral edge configuration for defining the path and penetration of said roller over a surface to be rolled;
 b. first follower means in positive mechanical contact with said profile-defining cam for following the peripheral edge of said profile-defining cam;
 c. means supporting each roller and responsive to said first follower means for individually and positively guiding each roller over said tire surface along said predetermined path at said desired depth of penetration; and
 d. means, including an orientation-defining cam having a peripheral edge configuration for defining the angular orientation of each roller relative to said surface to be rolled and second follower means for following the peripheral edge of said orientation-defining cam for control of the orientation of each roller, for continuously orienting each roller at a substantially normal angle of incidence relative to said tire surface as each roller is guided over said tire surface by said supporting means for each roller.

3. A tire stitching apparatus for rolling and stitching the various surfaces of a tire mounted on a tire building drum, the apparatus comprising:
 a. at least one stitching roller;
 b. a profile-defining cam having a peripheral edge configuration for defining the path and penetration of said roller over a surface to be rolled;
 c. first follower means in positive mechanical contact with said profile-defining cam for following the peripheral edge of said profile-defining cam;
 d. means supporting said roller and responsive to said first follower means for positively guiding said roller over said tire surface along said predetermined path at said desired depth of penetration;
 e. an orientation-defining cam having a peripheral edge configuration for defining the angular orientation of said roller relative to said surface to be rolled;
 f. second follower means mechanically positively guided along said profile-defining cam by said first follower means for following the peripheral edge of said orientation-defining cam; and
 g. means responsive to said second follower means for continuously orienting said roller at a substantially normal angle of incidence relative to said tire surface.

4. A tire stitching apparatus for rolling and stitching the various surfaces of a tire mounted on a tire building drum, wherein there are at least two stitching rollers and wherein there are for each roller:
 a. a profile-defining cam having a peripheral edge configuration for defining the path and penetration of said roller over a surface to be rolled;
 b. first follower means in positive mechanical contact with said profile-defining cam for following the peripheral edge of said profile-defining cam;
 c. means supporting each roller and responsive to said first follower means for individually and positively guiding each roller over said tire surface along said predetermined path at said desired depth of penetration;
 d. an orientation-defining cam having a peripheral edge configuration for defining the angular orientation of said roller relative to said surface to be rolled;
 e. second follower means mechanically positively guided along said profile-defining cam by said first follower means for each roller for following the peripheral edge of said orientation-defining cam; and
 f. means responsive to said second follower means for continuously orienting each roller at a substantially normal angle of incidence relative to said tire surface.

5. The tire stitching apparatus of claim 4, wherein a tire building drum is oriented with its axis of rotation in a horizontal position, and wherein the rollers are each mounted to a frame member for movement in reversible directions, both parallel to and transverse to a vertical plane including the axis of rotation of said drum, whereby said movements of each roller are controlled by the movements of said first follower means as it follows the peripheral edge of said profile-defining cam.

6. The tire stitching device of claim 5, wherein the rollers are each mounted to said frame member for pivotal movement of each roller about a predetermined vertical pivot axis, said pivotal movement of each roller being controlled by the movement of said second follower means as it follows the peripheral edge of said orientation-defining cam.

7. The tire stitching apparatus of claim 6, wherein said frame member comprises:
 a. a stationary frame placed in front of the tire-building drum;
 b. a moving frame mounted on said stationary frame for movement in reversible directions perpendicular to the axis of rotation of said tire building drum;
 c. two axial carriages mounted on said moving frame for synchronous movement in opposite directions parallel to the axis of rotation of said drum;
 d. two rolling-unit supports respectively mounted on the two axial carriages;
 e. two rolling-units respectively mounted on said two rolling-unit supports so as to be able to pivot about said predetermined vertical pivot axis, wherein each rolling-unit is provided with at least one of said first and second follower means;
 f. two rolling arms that are respectively mounted on said two rolling-units for pivotal movement about respective predetermined horizontal pivot axes; and
 g. individual means for independently driving each of said moving frame, axial carriages, rolling-units and rolling arms.

8. The tire stitching apparatus of claim 7, which apparatus includes a set of profile-defining cams and a set of orientation-defining cams, each cam being associated with the control of a movement of one of said stitching rollers over a predetermined segment of the tire to be rolled, the apparatus further comprising selector means for placing each of said first and second follower means into following relation with the peripheral edge of a selected profile-defining cam and orientation defining cam, respectively.

9. The tire stitching apparatus of claim 8, wherein the cams of said set of profile-defining cams are positioned in superimposed relation to one another and the cams of said set of orientation-defining cams are positioned in superimposed relation to one another.

10. The tire stitching device of claim 9, further comprising means for locking said moving frame in each of two extreme opposite positions.

11. The tire stitching apparatus of claim 10, further comprising:
 a. a reverse-pitch double-thread drive screw mounted on said moving frame; and
 b. two nuts for receiving the opposing ends of said screw, the nuts being respectively built into said two axial carriages, said screw controlling the synchronous movement of said carriage in directions parallel to the axis of rotation of the said tire building drum.

12. The tire stitching apparatus of claim 11, wherein said rolling units include corresponding parts therein located at different vertical levels relative to each other so that they may overlap to draw said rollers together.

13. The tire stitching apparatus of claim 11, further comprising:
 a. a pneumatic cushion installed between each rolling arm and the corresponding rolling unit to make said rolling arm pivot in a plane that is essentially vertical; and
 b. at least one adjustable stop associated with each rolling arm for limiting the amount of pivoting of said rolling arm in both directions.

14. The tire stitching apparatus of claim 13, wherein said first follower means comprises a first follower roller that revolves around an essentially vertical axis and that is arranged so that the point of tangential contact between said roller and said profile cam, and the point of application of the corresponding roller onto the above-indicated tread covering, are in substantial vertical alignment.

15. The tire stitching apparatus of claim 14, wherein said second follower means comprises photodetector means for following the contours of said orientation-defining cams.

16. A tire stitching apparatus for rolling and stitching the various surfaces of a tire mounted on a building drum, the apparatus comprising:
 a. at least one stitching roller;
 b. a profile-defining cam having a peripheral edge configuration for positively guiding said roller along a predetermined path over a tire surface to be rolled and stitched at a predetermined depth of penetration of said roller into said tire surface; and c. follower means in positive mechanical contact with said profile-defining cam for following the peripheral edge of said profile-defining cam and for maintaining said roller in a state of stable equilibrium when oriented at a substantially normal angle of incidence relative to said tire surface and, when said roller is disposed relative to said surface obliquely, for causing a torque to be generated of sufficient magnitude to urge said roller into said state of stable equilibrium and normal to said surface.

17. In a method of constructing a pneumatic tire being formed on a drum having an axis of rotation, the method of rolling a tire tread wherein a pair of rollers are employed for the rolling and at least a separate cam for each roller and a separate cam follower mechanically attached to each roller and a separate thrust jack acting on each cam follower are employed for orienting and guiding said rollers, said method comprising the steps of:
 guiding said rollers by said cams and cam followers and thrust jacks along a predetermined path for defining the position of said rollers and limiting their depth of penetration of said tread, each said cam defining the path to be followed by its associated roller; and
 maintaining each said roller in a position of stable equilibrium substantially perpendicular to said tread surface by the resolution of force applied to said roller by its associated thrust jack and by the reaction of each said cam on each said cam follower.

* * * * *

PO-1050
(5/69)

UNITED STATES PATENT OFFICE
CERTIFICATE OF CORRECTION

Patent No. 3,850,719     Dated November 26, 1974

Inventor(s) Jean Rene Leblond, Guy Emile Danneels, Maurice Avrelien Lambert

It is certified that error appears in the above-identified patent and that said Letters Patent are hereby corrected as shown below:

column 14, line 64 for "continuous"

read --continuously--

Signed and sealed this 4th day of March 1975.

(SEAL)
Attest:

RUTH C. MASON
Attesting Officer

C. MARSHALL DANN
Commissioner of Patents
and Trademarks